(12) United States Patent
Sawada et al.

(10) Patent No.: US 8,459,730 B2
(45) Date of Patent: Jun. 11, 2013

(54) ROOF APPARATUS

(75) Inventors: Kazuki Sawada, Handa (JP); Makoto Muranaka, Kariya (JP); Shinichi Hiramatsu, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/355,988

(22) Filed: Jan. 23, 2012

(65) Prior Publication Data

US 2012/0193945 A1 Aug. 2, 2012

(30) Foreign Application Priority Data

Jan. 28, 2011 (JP) .................................. 2011-016542

(51) Int. Cl.
*B60J 7/047* (2006.01)
*B60J 7/057* (2006.01)

(52) U.S. Cl.
USPC ................. 296/223; 296/216.08; 296/216.03; 296/224

(58) Field of Classification Search
USPC .................. 296/216.02–216.05, 220.01, 223, 296/224
See application file for complete search history.

(56) References Cited

U.S. PATENT DOCUMENTS

| 6,550,853 | B2 | 4/2003 | Wingen et al. |
| 6,682,134 | B2 | 1/2004 | De Gaillard et al. |
| 7,125,070 | B2 | 10/2006 | Sawada et al. |
| 7,252,327 | B2 | 8/2007 | Sawada et al. |
| 7,344,188 | B2 * | 3/2008 | Sawada et al. ................ 296/224 |
| 7,784,859 | B2 | 8/2010 | Grimm et al. |
| 8,177,295 | B2 * | 5/2012 | Chauvin et al. .......... 296/220.01 |

FOREIGN PATENT DOCUMENTS

JP 2005-153803 A 6/2005

* cited by examiner

*Primary Examiner* — Dennis Pedder
(74) *Attorney, Agent, or Firm* — Buchanan Ingersoll & Rooney PC

(57) ABSTRACT

A roof apparatus includes a functional bracket supporting a movable panel, a guide rail extending in a longitudinal direction of a vehicle, a drive shoe moving along the guide rail, a front link connected to the functional bracket to move in the longitudinal direction in conjunction with the movement of the drive shoe, a front guide portion guiding the functional bracket and the front link in the longitudinal direction, a check member engaged with the drive shoe to move rearward with the drive shoe when a distance of the rearward movement of the drive shoe is shorter than a predetermined distance, the check member disengaged from the drive shoe when the distance of the rearward movement of the drive shoe is equal to or longer than the predetermined distance, a rear link engaged with the check member, and a rear guide portion guiding the rear link in the longitudinal direction.

8 Claims, 19 Drawing Sheets

Upper side ↑
Interior side ← → Exterior side
↓ Lower side

Upper side ↑
Interior side ← → Exterior side
↓ Lower side

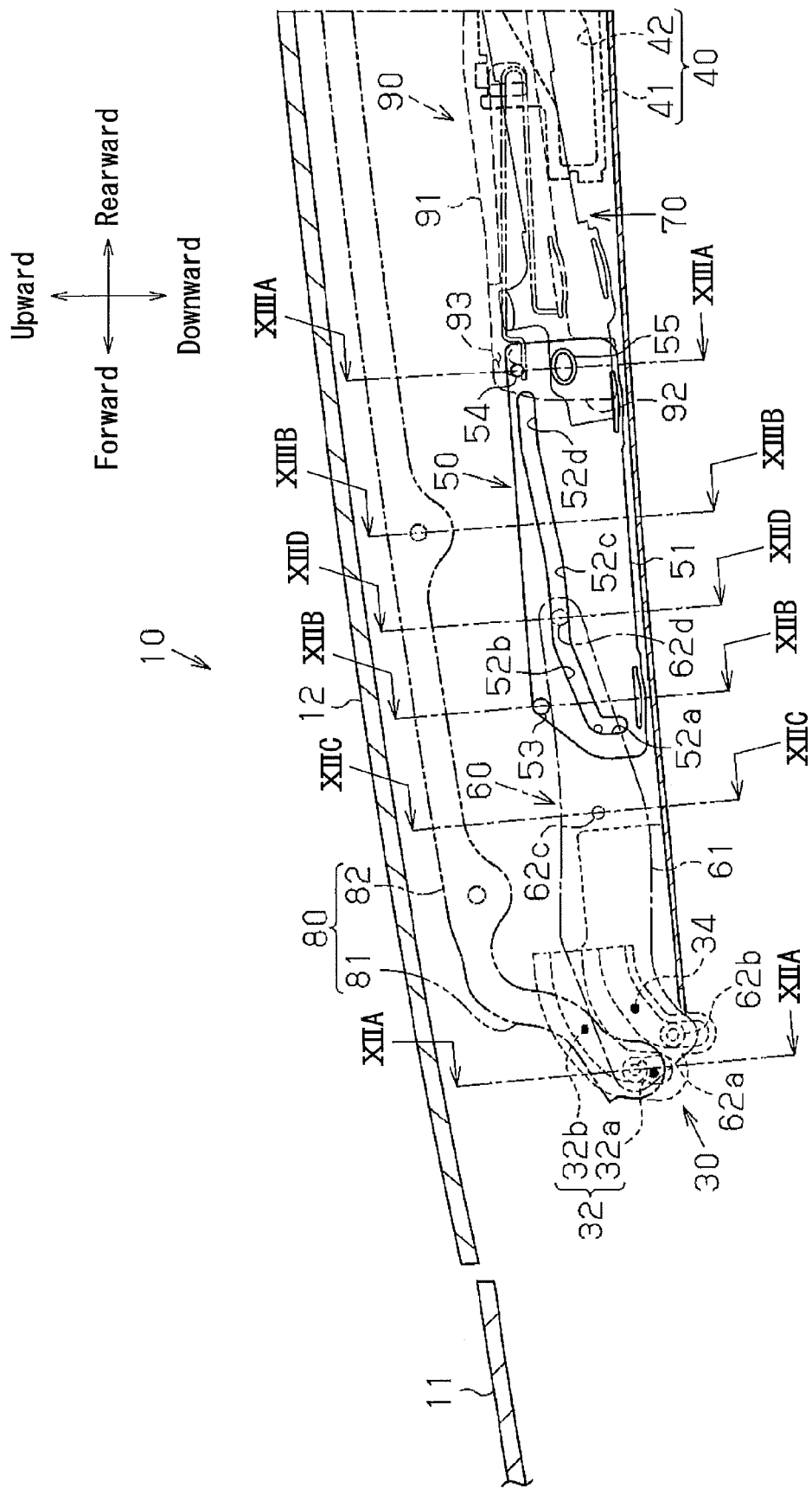

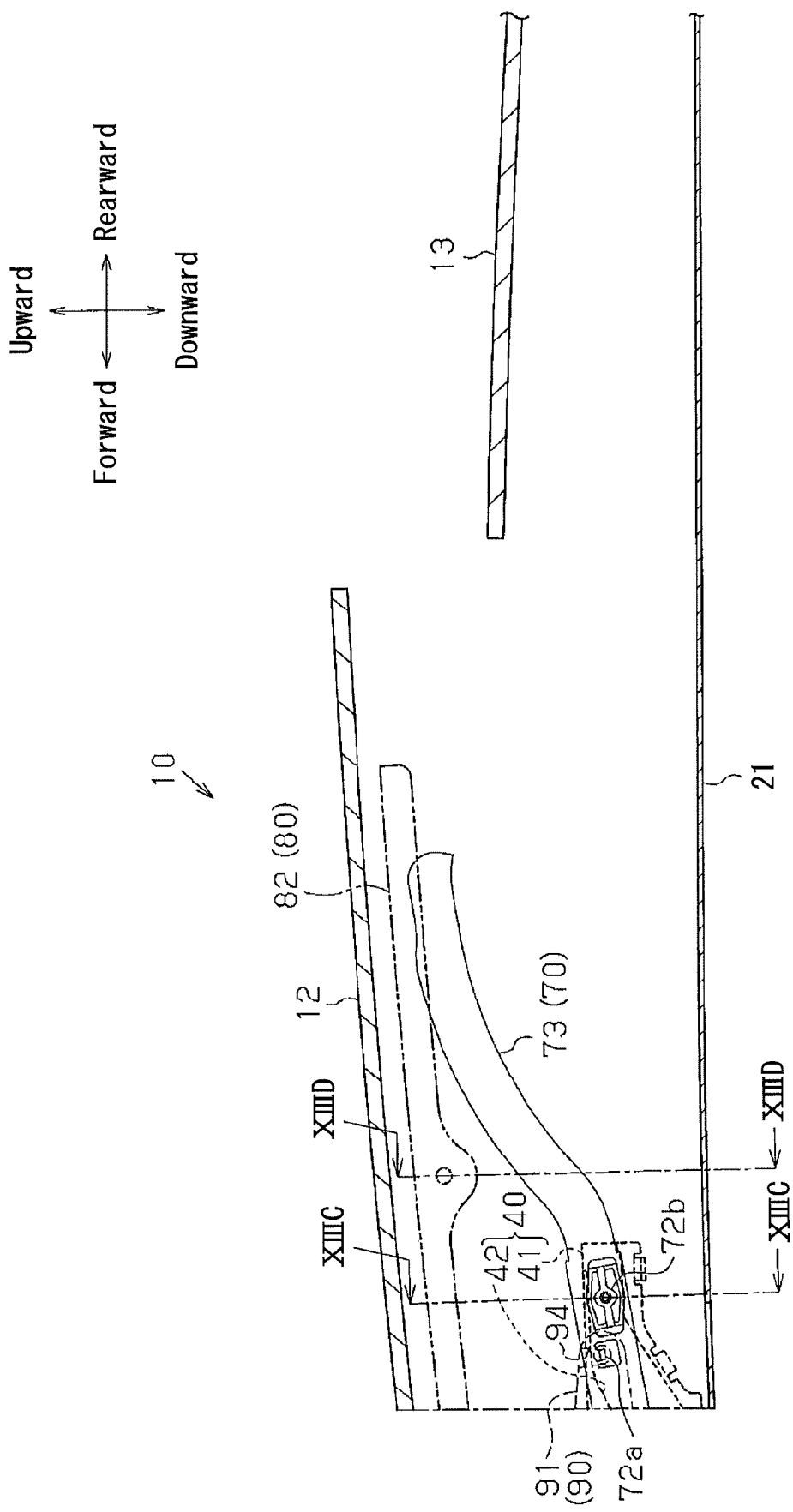

FIG. 12A
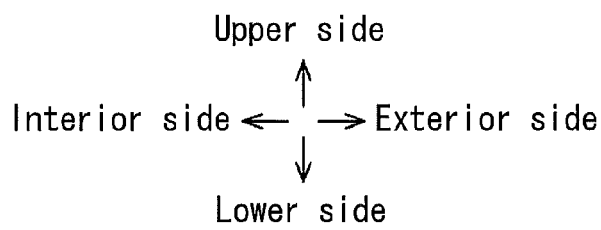
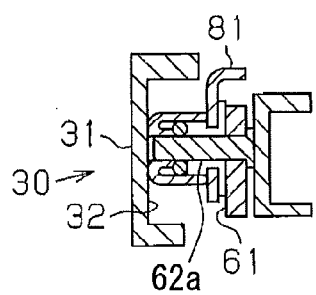
FIG. 12B
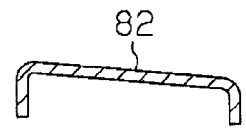
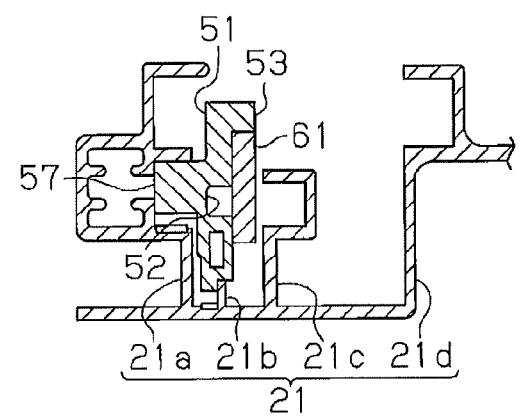
FIG. 12C
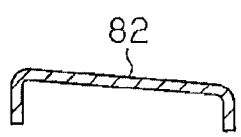
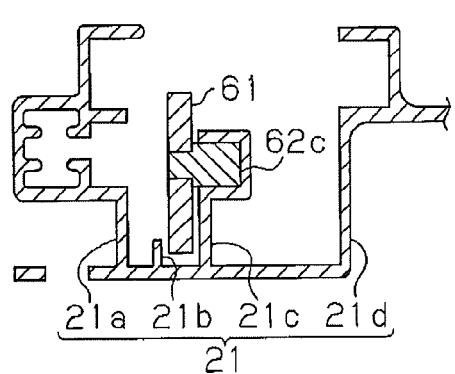
FIG. 12D
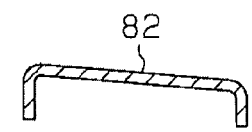
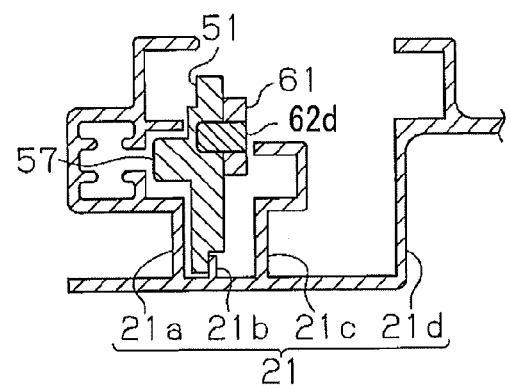

FIG. 18A
Upper side ↑
Interior side ← → Exterior side
↓ Lower side
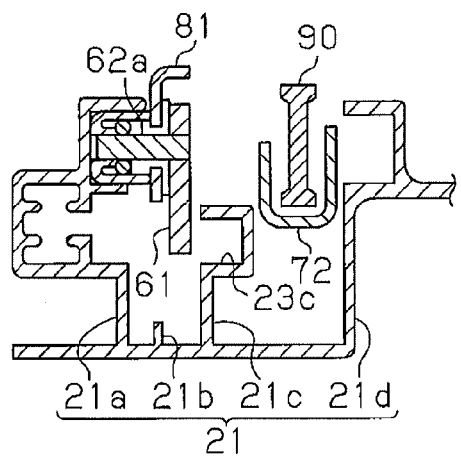
FIG. 18B
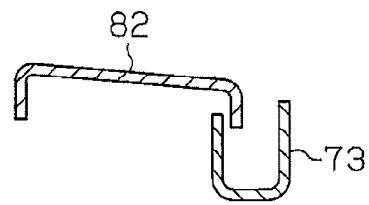
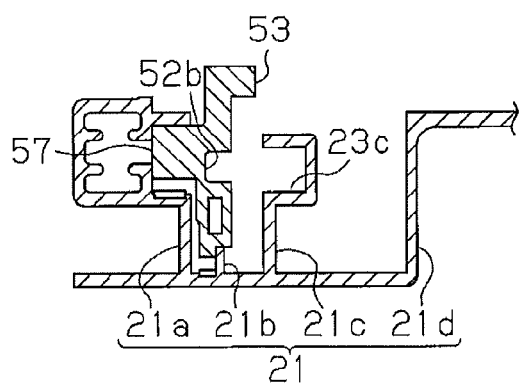
FIG. 18C
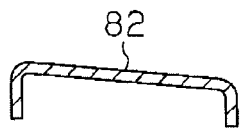
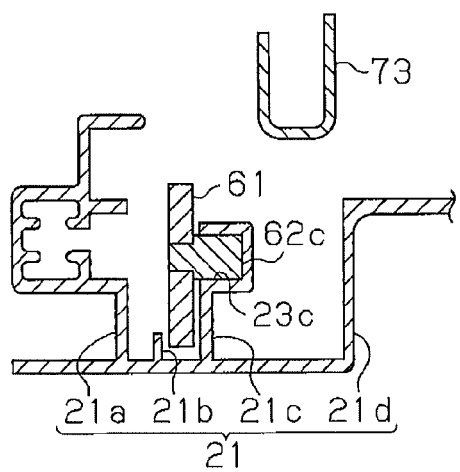
FIG. 18D
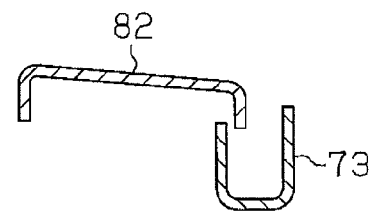
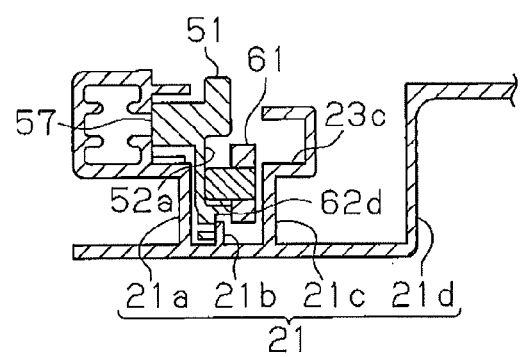

FIG. 19A
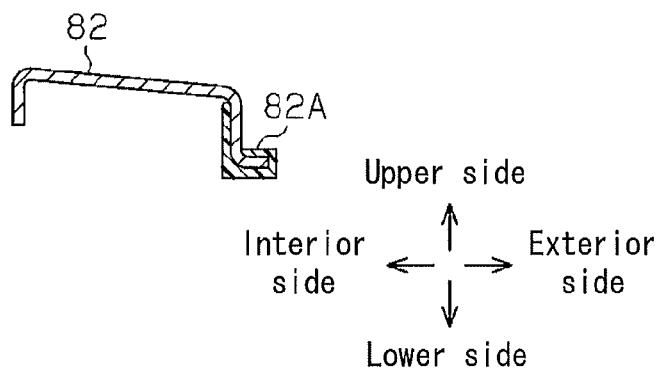
FIG. 19B
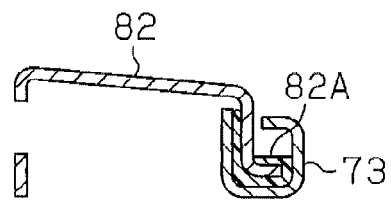
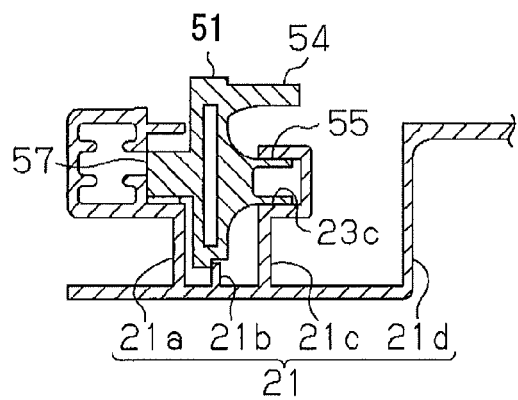
FIG. 19C
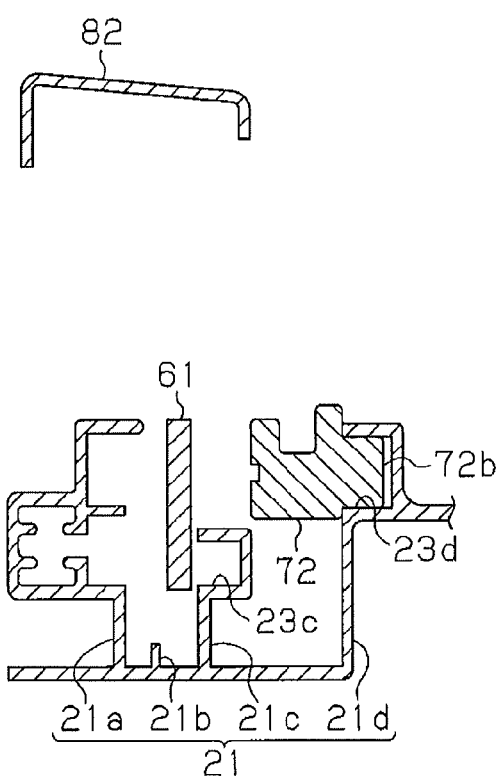
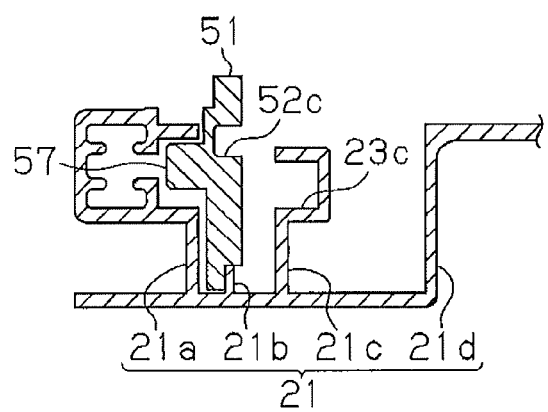
FIG. 19D
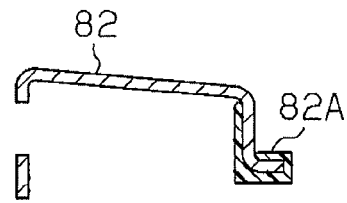

ROOF APPARATUS

CROSS REFERENCE TO RELATED APPLICATIONS

This application is based on and claims priority under 35 U.S.C. §119 to Japanese Patent Application 2011-016542, filed on Jan. 28, 2011, the entire content of which is incorporated herein by reference.

TECHNICAL FIELD

This disclosure generally relates to a roof apparatus.

BACKGROUND DISCUSSION

A known roof apparatus generally operates a movable panel, which is arranged at an opening portion of a roof panel for a vehicle, in opening and closing directions. The known roof apparatus disclosed, for example, in JP2005-153803A (hereinafter referred to as Reference 1) includes the movable panel arranged at the opening portion of the roof panel, a functional bracket supporting the movable panel, a guide rail extending in a longitudinal direction of the vehicle to be attached to the roof panel, and a belt movable along the guide rail in the longitudinal direction. The belt is driven by an electric motor so as to move in the longitudinal direction; thereby, the functional bracket is moved in the longitudinal direction in conjunction with the movement of the belt. As a result, the movable panel moves in the opening and closing directions. The opening and closing operations of the movable panel include tilt-up and slide modes. The movable panel includes front and rear end portions and a rotational axis arranged at the front end portion to extend along a width direction of the vehicle. The front end portion of the movable panel rotates about the rotational axis, thereby moving the rear end portion of the movable panel upward. As a result, the movable panel is tilted forward (a state in which the movable panel is tilted forward will be referred to as a tilted-up state). In a case where the movable panel is brought into the slide mode, the front end portion of the movable panel is moved upward from the tilted-up state and the movable panel is slid rearward.

In particular, in a state where the movable panel is in a fully closed position, front and rear shoes positioned at front and rear end portions, respectively, of the functional bracket are slidably arranged on the guide rail. The front and rear shoes are connected to the belt so as to move along the guide rail in the longitudinal direction in accordance with the movement of the belt.

A front check block is arranged between the front shoe and the functional bracket. A rear check block and a lift up/down guide are arranged between the rear shoe and the functional bracket.

The front check block is engaged with the front shoe and is restricted from moving in the longitudinal direction until the rear end portion of the functional bracket is completely moved upward. After the rear end portion of the functional bracket is completely moved upward, that is, in a state where the movable panel is in the slide mode, the front check block integrally slides with the front shoe, thereby allowing the front end portion of the functional bracket to move in the longitudinal direction.

The rear check block is switchable between moving and stopped states. When being in the moving state, the rear check block integrally slides with the rear shoe. When being in the stopped state, the rear check block is separated from the rear shoe and the sliding movement is stopped. The lift up/down guide functions to support the rear check block so that the rear check block rotates. In addition, the lift up/down guide functions to lift the rear end portion of the functional bracket up and down in accordance with the rotation of the rear check block.

According to the roof apparatus configured as described above, the belt is moved by the electric motor in the longitudinal direction, thereby moving the front and rear shoes in the longitudinal direction. Therefore, the front and rear check blocks and the lift up/down guide function in accordance with the movements of the front and rear check blocks as described above. As a result, the tilt-up and slide modes of the movable panel are performed.

In addition, according to the roof apparatus disclosed in Reference 1, the front and rear shoes are both connected to the belt; therefore, the front and rear shoes are positioned at lower sides of the respective front and rear end portions of the movable panel in a state where the movable panel is in a fully opened position.

In the roof apparatus disclosed in Reference 1, the front and rear shoes arranged at the respective front and rear end portions of the movable panel are necessary for the movable panel to move in the opening and closing directions. Therefore, the guide rail requires a length in the longitudinal direction so as to extend at least from a longitudinal position corresponding to the front end portion of the movable panel being in the fully closed position, to a longitudinal position corresponding to the rear end portion of the movable panel being in the fully opened position. As a result, in a case where an internal space of the vehicle, particularly, a space right below the roof panel is intended to be effectively utilized, minimization of a length of the guide rail in the longitudinal direction may be limited.

A need thus exists for a roof apparatus which is not susceptible to the drawback mentioned above.

SUMMARY

According to an aspect of this disclosure, a roof apparatus operates a movable panel in opening and closing directions, the movable panel being arranged at an opening portion of a roof panel for a vehicle, the opening and closing operations including tilt-up and slide modes of the movable panel. The roof apparatus includes a functional bracket supporting the movable panel, a guide rail adapted to be attached to the roof panel, the guide rail extending in a longitudinal direction of the vehicle, a drive shoe driven to move along the guide rail in the longitudinal direction, a front link connected to a front portion of the functional bracket to move in the longitudinal direction in conjunction with the movement of the drive shoe, a front guide portion engaged with the front portion of the functional bracket and with a front portion of the front link to guide the front portions of the functional bracket and the front link to move in the longitudinal direction, a check member provided to be engageable with the drive shoe, the check member being engaged with the drive shoe to move rearward in conjunction with the movement of the drive shoe in a rearward direction of the vehicle when a distance of the rearward movement of the drive shoe is shorter than a predetermined distance, the check member being disengaged from the drive shoe when the distance of the rearward movement of the drive shoe is equal to or longer than the predetermined distance, a rear link engaged with the check member to support a portion of the functional bracket so that the portion is slidable in the longitudinal direction, the portion being positioned rearward than the front portion of the functional bracket, and a rear guide portion guiding the rear link to move in the longitudinal direction.

BRIEF DESCRIPTION OF THE DRAWINGS

The foregoing and additional features and characteristics of this disclosure will become more apparent from the following detailed description considered with the reference to the accompanying drawings, wherein:

FIG. 10 is a vertical cross-sectional view illustrating the front side of the sunroof apparatus in a tilted-up state;

FIG. 11 is a vertical cross-sectional view illustrating the rear side of the sunroof apparatus in the tilted-up state;

FIG. 12A is a vertical cross-sectional view taken along the line XIIA-XIIA in FIG. 10;

FIG. 12B is a vertical cross-sectional view taken along the line XIIB-XIIB in FIG. 10;

FIG. 12C is a vertical cross-sectional view taken along the line XIIC-XIIC in FIG. 10;

FIG. 12D is a vertical cross-sectional view taken along the line XIID-XIID in FIG. 10;

FIG. 18A is a cross-sectional vertical view taken along the line XVIIIA-XVIIIA in FIG. 16;

FIG. 18B is a cross-sectional vertical view taken along the line XVIIIB-XVIIIB in FIG. 16;

FIG. 18C is a cross-sectional vertical view taken along the line XVIIIC-XVIIIC in FIG. 16;

FIG. 18D is a cross-sectional vertical view taken along the line XVIIID-XVIIID in FIG. 16;

FIG. 19A is a cross-sectional vertical view taken along the line XIXA-XIXA in FIG. 17;

FIG. 19B is a cross-sectional vertical view taken along the line XIXB-XIXB in FIG. 16;

FIG. 19C is a cross-sectional vertical view taken along the line XIXC-XIXC in FIG. 16; and FIG. 19D is a cross-sectional vertical view taken along the line XIXD-XIXD in FIG. 17.

DETAILED DESCRIPTION

A roof apparatus applied to a vehicle such as an automobile, according to an embodiment of this disclosure will be explained as follows with reference to FIGS. 1A to 19D. The roof apparatus according to the embodiment will be hereinafter referred to as a sunroof apparatus 10.

Directions such as a longitudinal direction (front and rear sides) and a vertical direction (upper and lower sides) that are described in the embodiment will be hereinafter referred to as a longitudinal direction (front and rear sides) and a vertical direction (upper and lower sides) of the vehicle unless otherwise specified. In addition, a position close to a center side of the sunroof apparatus 10 in a width direction of the vehicle will be hereinafter referred to as an internal side of the vehicle. A position separated from the center side of the sunroof apparatus 10 in the width direction of the vehicle will be referred to as an exterior side of the vehicle.

Figure 1A:
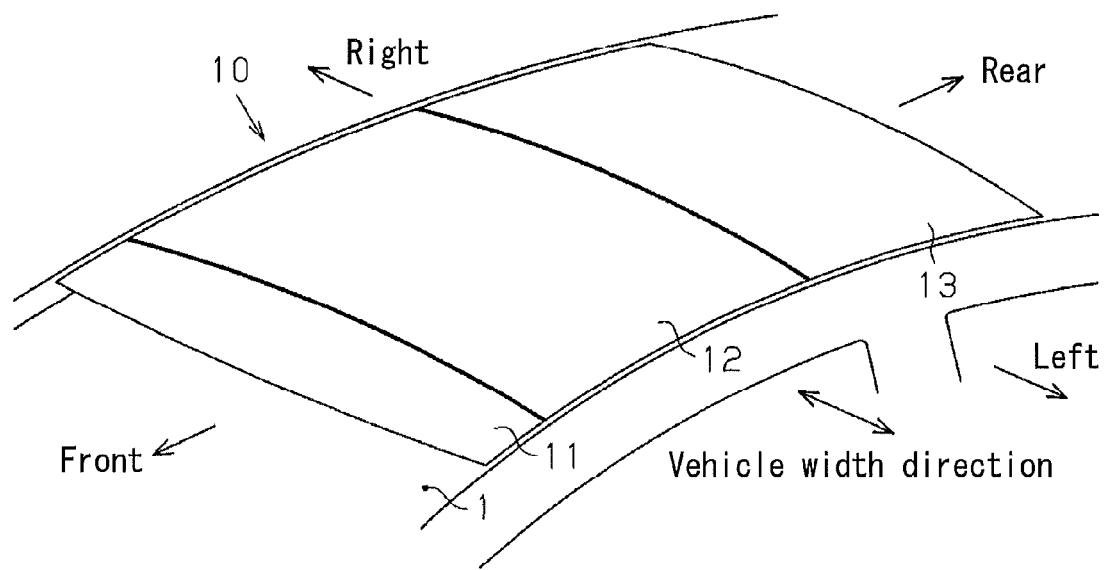
FIG. 1A is a schematic perspective view illustrating a state where a sunroof apparatus according to an embodiment disclosed here is in a fully closed state.
Figure 1B:
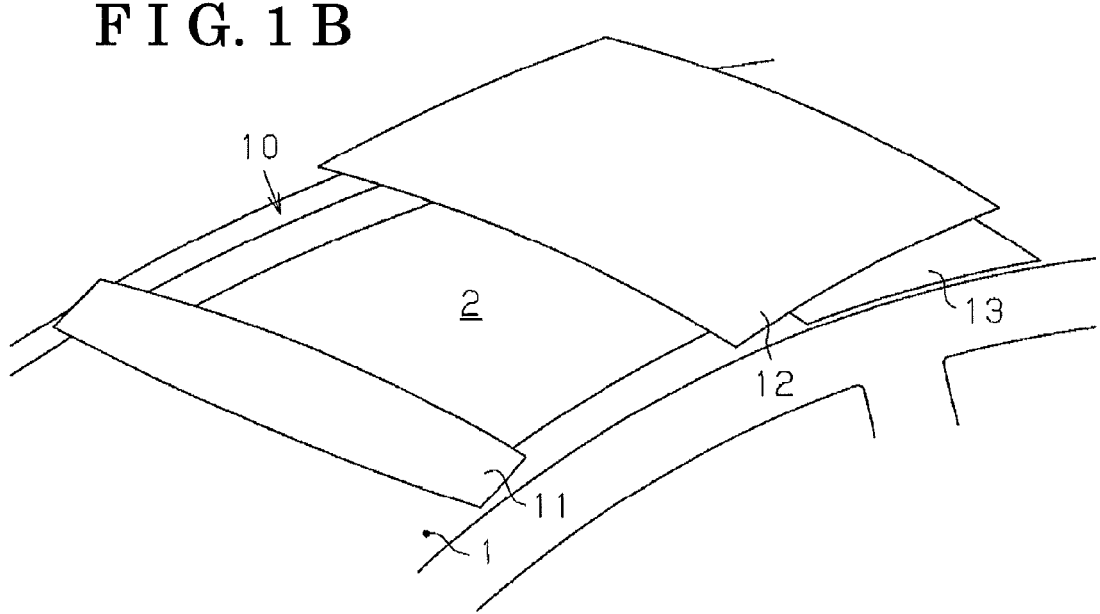
FIG. 1B is a schematic perspective view illustrating a state where the sunroof apparatus according to the embodiment disclosed here is in a fully opened state.

Each of FIGS. 1A and 1B schematically illustrates a perspective view of a roof panel 1 at which the sunroof apparatus 10 is arranged. As illustrated in FIG. 1A, the sunroof apparatus 10 is in a closed state. As illustrated in FIG. 1B, the sunroof apparatus 10 is in a fully opened state.

As illustrated in FIG. 1 B, an opening portion 2 is formed in the roof panel 1. A deflector panel 11, a movable panel 12, and a fixed panel 13 are arranged at the opening portion 2 in the mentioned order from the front side of the vehicle. Each of the deflector panel 11, the movable panel 12, and the fixed panel 13 is formed by a glass panel or the like corresponding to a light transmitting member. As illustrated in FIG. 1A, the deflector panel 11, the movable panel 12, and the fixed panel 13 cover the opening portion 2 from an upper side of the opening portion 2 in a state where the sunroof apparatus 10 is in the fully closed state.

The deflector panel 11 includes front and rear end portions extending along the width direction and a rotational axis arranged at the front end portion to extend along the width direction. The front end portion of the deflector panel 11 is rotatable about the rotational axis, thereby moving the rear end portion of the deflector 11 upward. As a result, the deflector panel 11 is brought into a forward tilted state (tilted-up state), i.e. the deflector panel 11 is tiltable. In addition, the deflector panel 11 tilts up in conjunction with an opening operation of the movable panel 12.

The movable panel 12 is attached to the opening portion 2 so as to tilt up and so as to slide in the longitudinal direction of the vehicle. The sunroof apparatus 10 is configured so that the movable panel 12 is slidable while being maintained in a tilted-up state. In other words, the sunroof apparatus 10 corresponds to an outer sliding sunroof apparatus.

The fixed panel 13 is fixed relative to the roof panel 1 and is positioned so as to face a portion of the opening portion 2. The facing portion of the opening portion 2 relative to the fixed panel 13 is maintained by the fixed panel 13 in a closed state.

Figure 2:
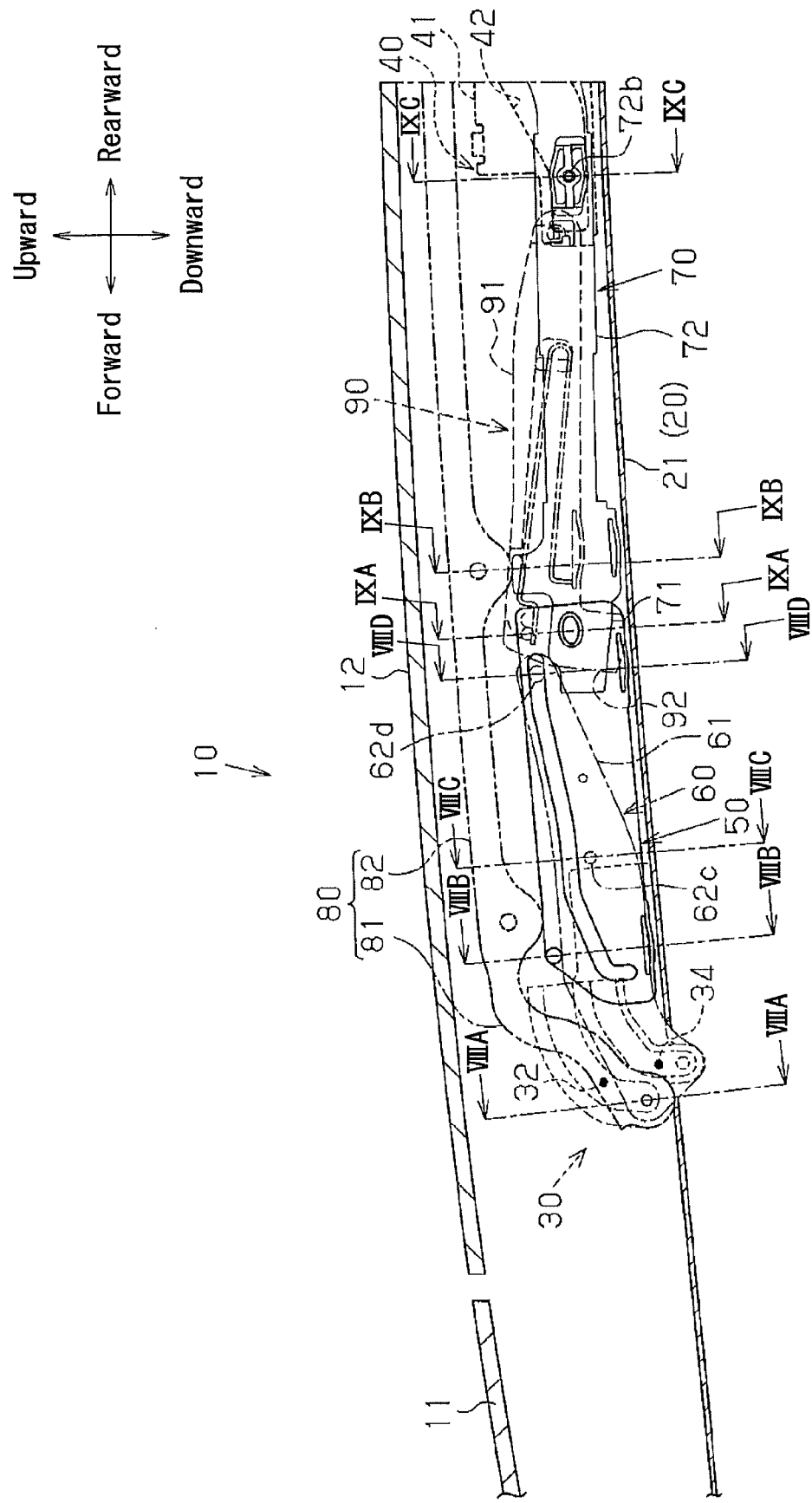
FIG. 2 is a vertical cross-sectional view of a front side of the sunroof apparatus shown in FIG. 1A.
Figure 3:
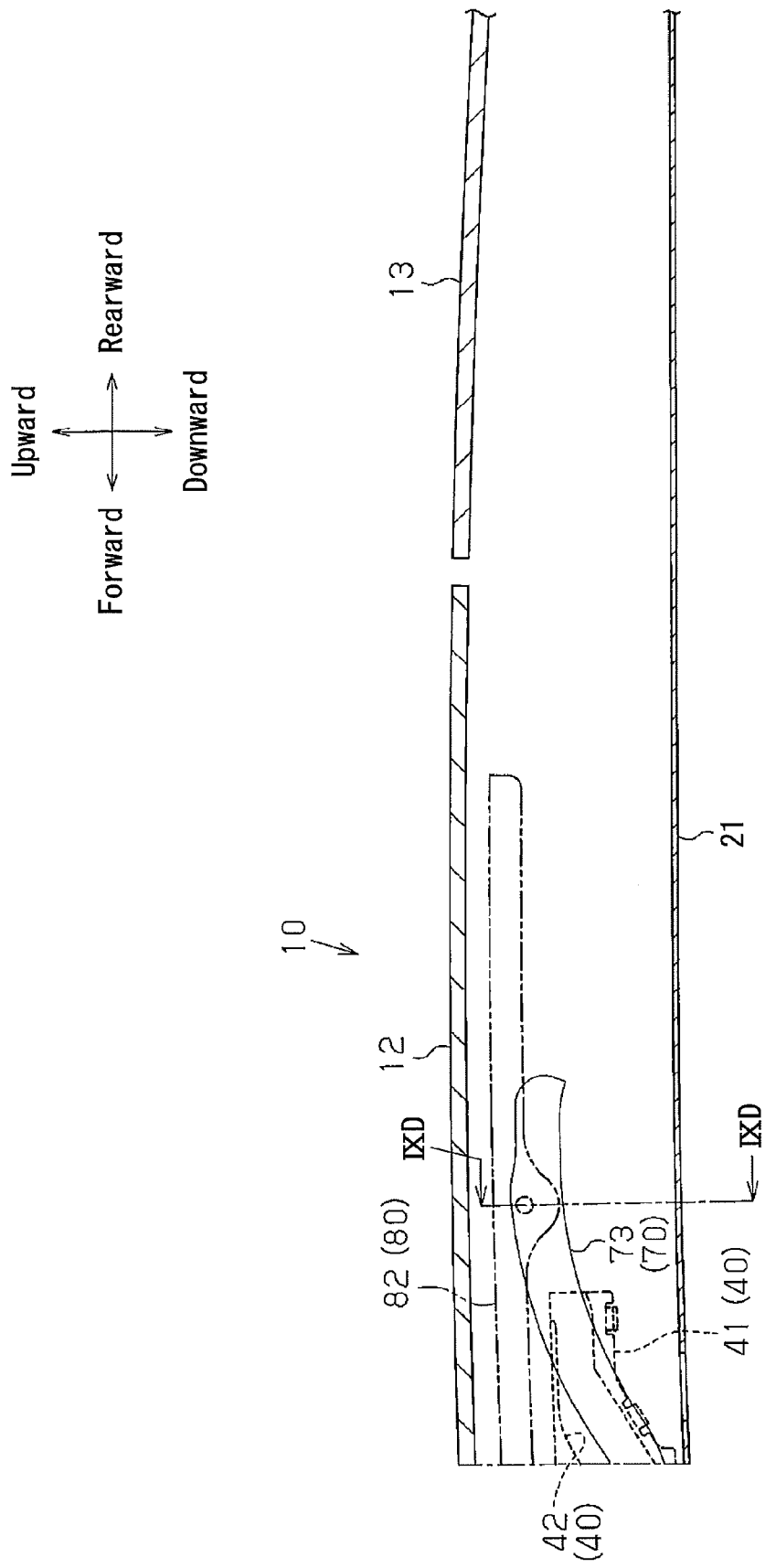
FIG. 3 is a vertical cross-sectional view of a rear side of the sunroof apparatus shown in FIG. 1A.

Next, a mechanism to move the movable panel 12 in opening and closing directions will be described as follows with reference to FIG. 2 to FIG. 19D. FIG. 2 illustrates a vertical cross-sectional view of a front side of the sunroof apparatus 10 in a fully closed state. FIG. 3 illustrates a vertical cross-sectional view of a rear side of the sunroof apparatus 10 in the fully closed state. In FIGS. 2 and 3, components of the sunroof apparatus 10 are shown by different types of lines from one another.

In addition, the sunroof apparatus 10 basically has a bilateral configuration in the width direction; therefore, a right side of the sunroof apparatus 10 will be hereinafter explained and detailed explanations of a left side of the sunroof apparatus 10 will be hereinafter omitted.

As illustrated in each of FIGS. 2 and 3, the sunroof apparatus 10 mainly includes the movable panel 12, a guide rail 20, a front guide member 30 (front guide portion), a rear guide member 40 (rear guide portion), a drive shoe 50, a front link 60, a rear link 70, a functional bracket 80, and a check member 90. The front guide member 30, the rear guide member 40, the drive shoe 50, the front link 60, the rear link 70, the functional bracket 80, and the check member 90 are arranged on the guide rail 20.

The functional bracket 80 includes a support portion 82 and an arm portion 81 that extends obliquely forward and downward from a front end portion of the support portion 82. The support portion 82 is formed so as to extend along an interior surface of the movable panel 12 in the longitudinal direction. The support portion 82 is connected to the movable panel 12 to thereby support the movable panel 12.

The guide rail 20 formed to extend in the longitudinal direction is fixed to the roof panel 1. As illustrated in FIG. 2, the front guide member 30 is fixed to a front end portion of the guide rail 20.

In addition, a belt driven by an electric motor is connected to the drive shoe 50. The belt is moved in the longitudinal direction by a driving force of the electric motor, thereby moving the drive shoe 50 in the longitudinal direction in conjunction with the longitudinal movement of the belt.

The front link 60 includes a main body 61 formed in a flat plate shape extending in the longitudinal direction. A front end portion of the main body 61 (a front portion of the front link 60) is connected to a front end portion (front portion) of the functional bracket 80 while a rear end portion of the main body 61 is connected to the drive shoe 50.

The check member 90 includes a main body 91 and an extending portion 92. The main body 91 is formed in a flat plate shape extending in the longitudinal direction. The extending portion 92 extends obliquely downward from a front end portion of the main body 91. As illustrated in each of FIGS. 2 and 3, the rear guide member 40 is fixed to the guide rail 20 so as to be positioned thereon further rearward than the front guide member 30.

Figure 4:
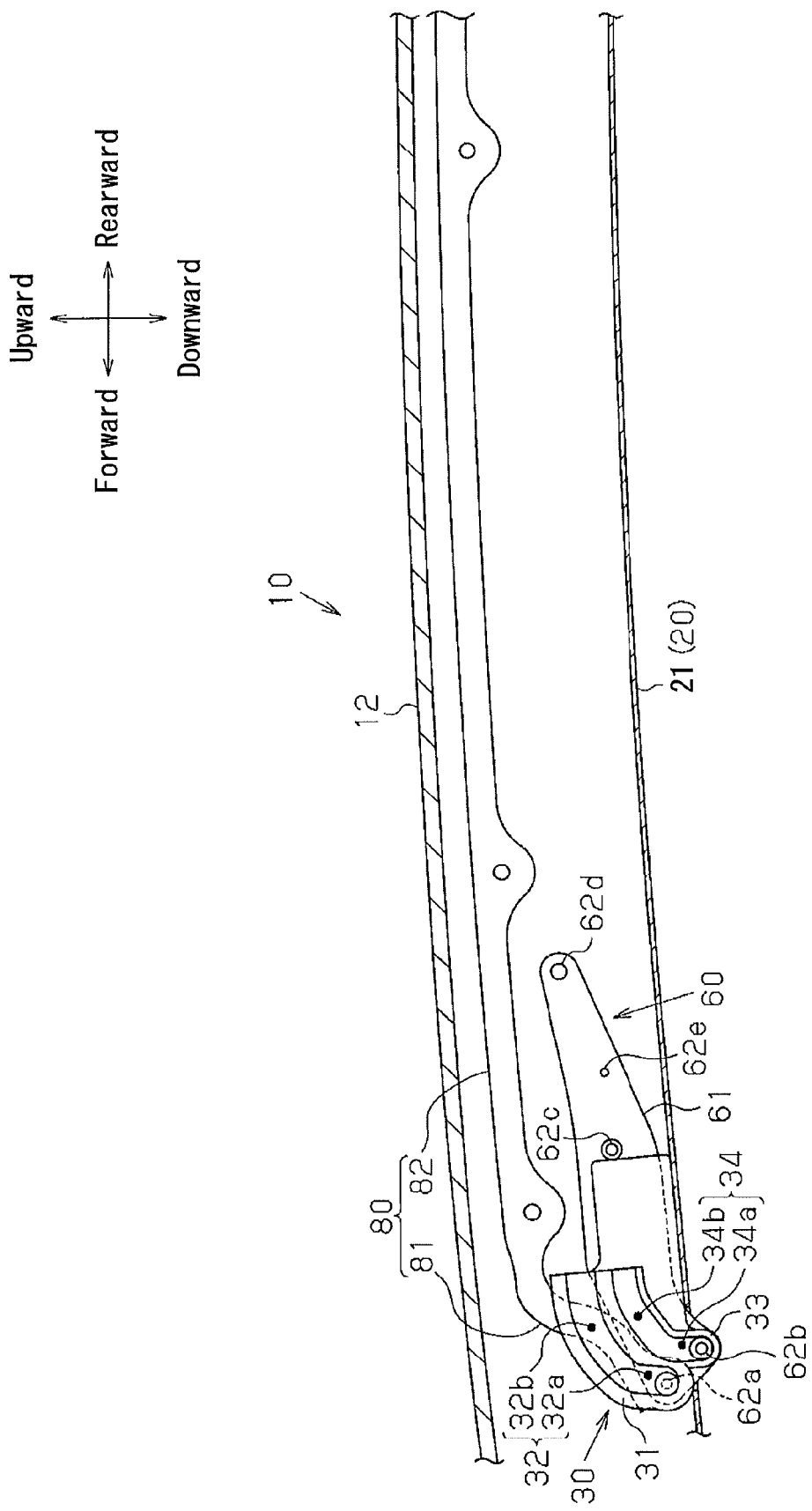
FIG. 4 is a cross-sectional view selectively illustrating a front guide member, a front link, and a functional bracket from components of the sunroof apparatus shown in FIG. 2.
Figure 5:
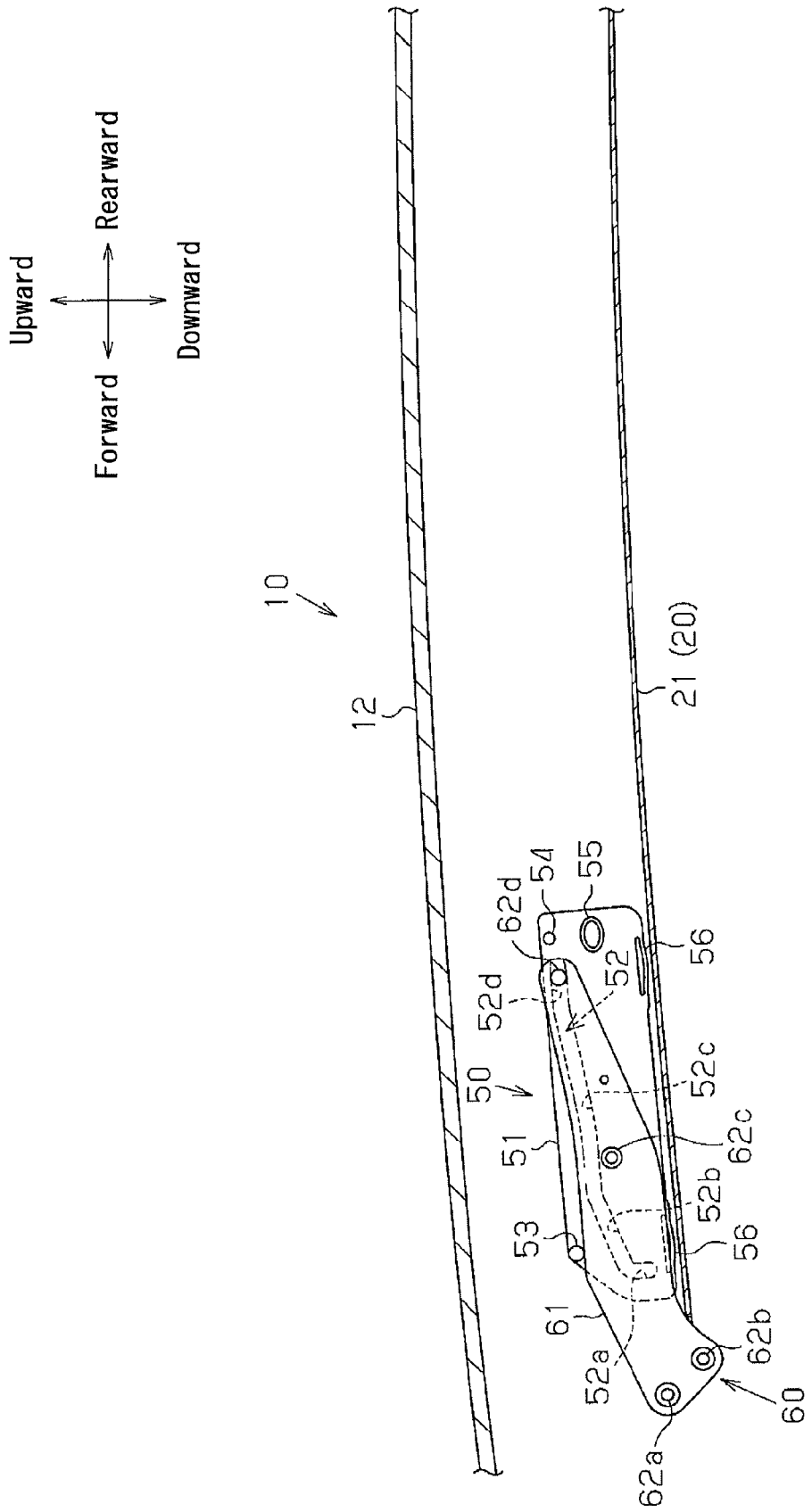
FIG. 5 is a cross-sectional view selectively illustrating the front link and a drive shoe from the components of the sunroof apparatus shown in FIG. 2.
Figure 6:
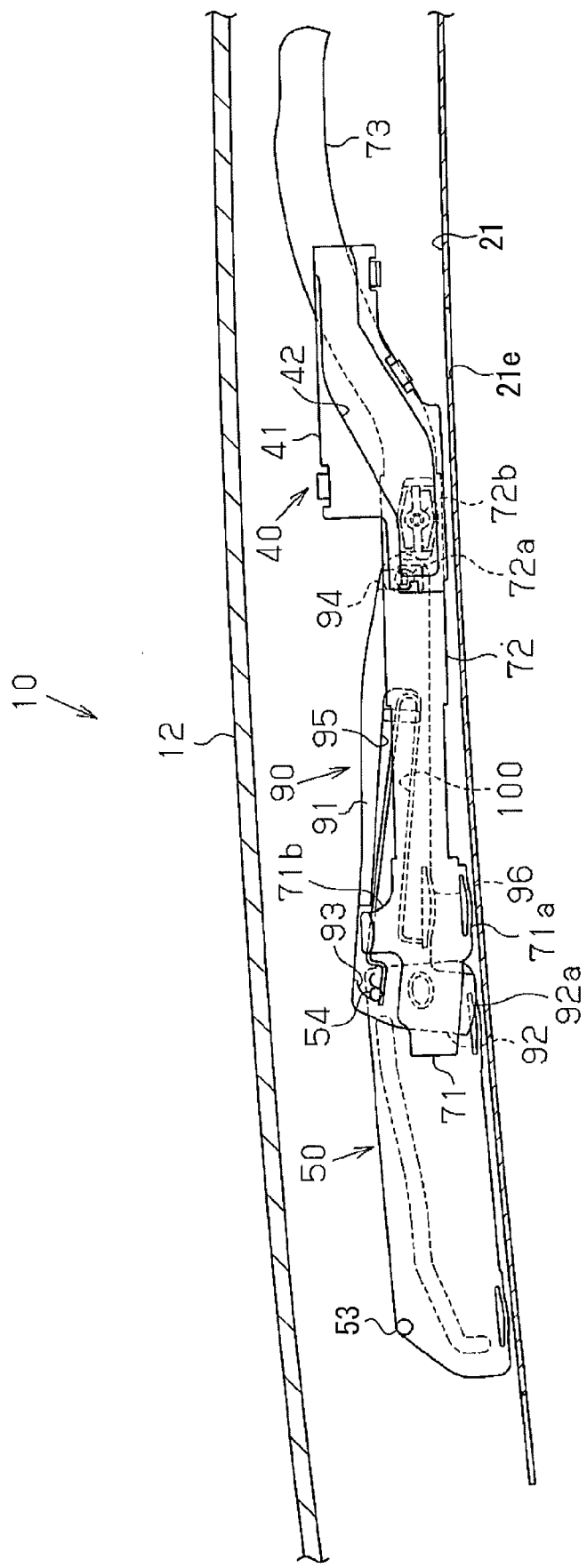
FIG. 6 is a cross-sectional view selectively illustrating the drive shoe, a check member, a rear link, and a rear guide member from the components of the sunroof apparatus shown in FIG. 2.
Figure 7A:
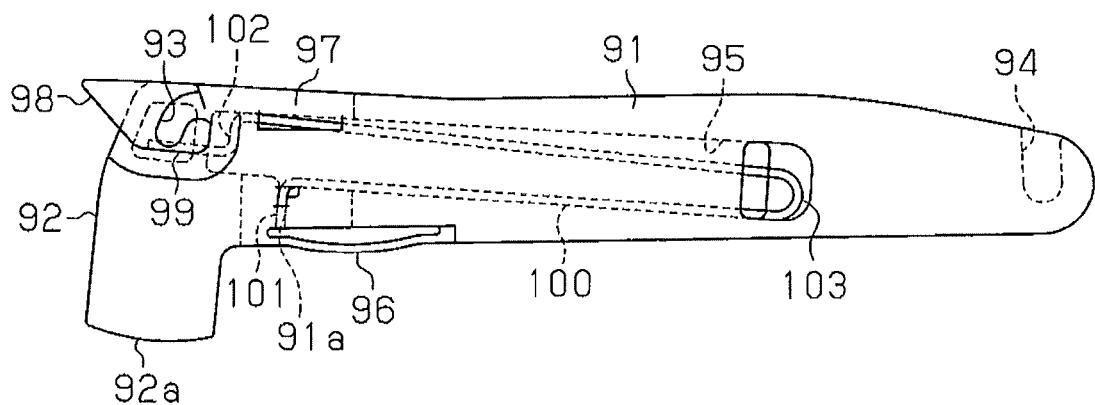
FIG. 7A is a front view of the check member.
Figure 7B:
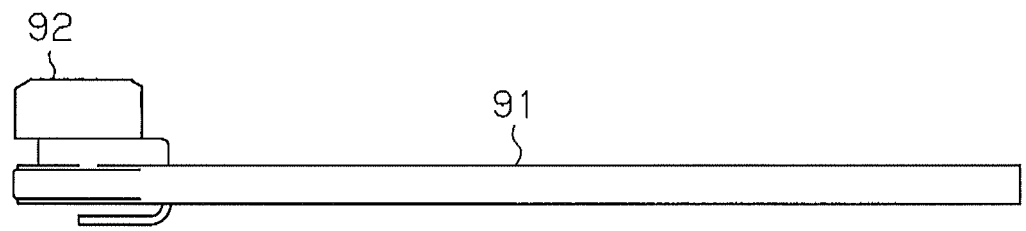
FIG. 7B is a top plan view of the check member.
Figure 7C:
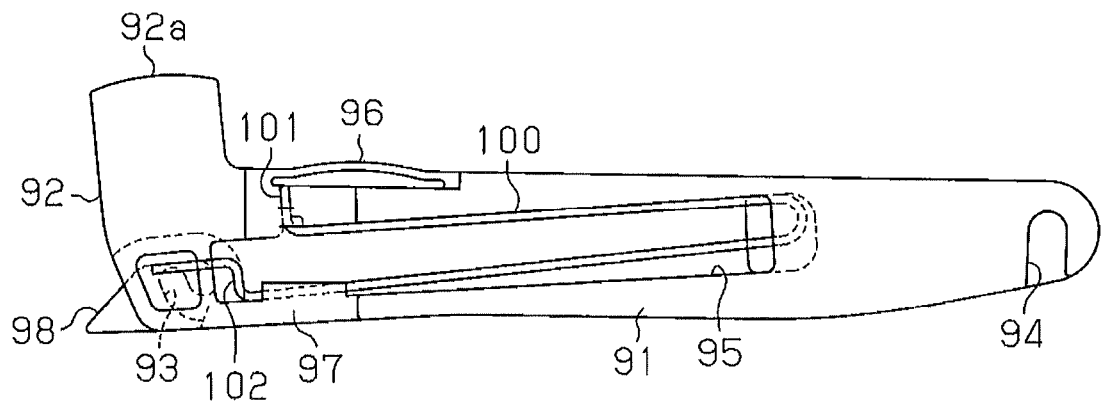
FIG. 7C is a vertically reversed view of the check member shown in FIG. 7A.

Here, further detailed explanations of the mechanism to move the movable panel 12 in the opening and closing directions will be described as follows with reference to FIGS. 4 to 9D. The movable panel 12, the functional bracket 80, the front guide member 30, the front link 60, and the like are illustrated in FIG. 4 selectively from the components of the sunroof apparatus 10 shown in FIG. 2. The front link 60 and the drive shoe 50 are illustrated in FIG. 5 selectively from the components of the sunroof apparatus 10 shown in FIG. 2. The drive shoe 50, the check member 90, the rear link 70, and the rear guide member 40 are illustrated in FIG. 6 selectively from the components of the sunroof apparatus 10 shown in FIG. 2. FIG. 7A illustrates a front view of the check member 90. FIG. 7B illustrates a top plan view of the check member 90. FIG. 7C illustrates a vertically reversed view of the check member 90 of FIG. 7A.

In addition, FIGS. 8A, 8B, 8C, and 8D illustrate vertical cross-sectional views taken along the lines VIIIA-VIIIA, VIIIB-VIIIB, VIIIC-VIIIC, and VIIID-VIIID of FIG. 2. FIGS. 9A, 9B, and 9C illustrate vertical cross-sectional views taken along the lines IXA-IXA, IXB-IXB, and IXC-IXC of FIG. 2 and FIG. 9D illustrates a vertical cross-sectional view taken along the line IXD-IXD of FIG. 3.

Figure 8A:
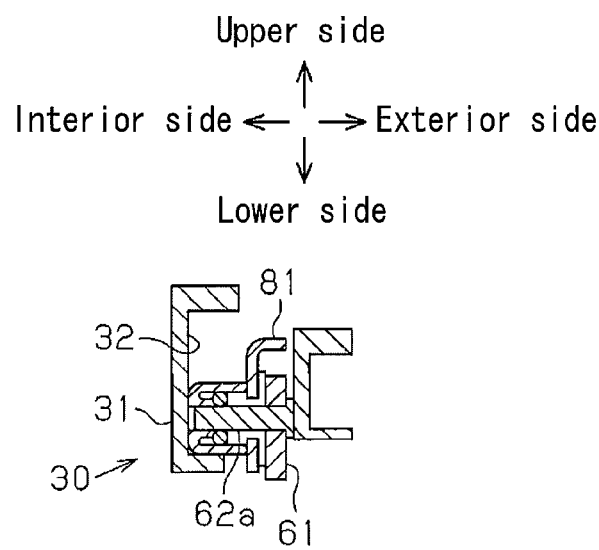
FIG. 8A is a vertical cross-sectional view taken along the line VIIIA-VIIIA in FIG. 2.
Figure 9A:
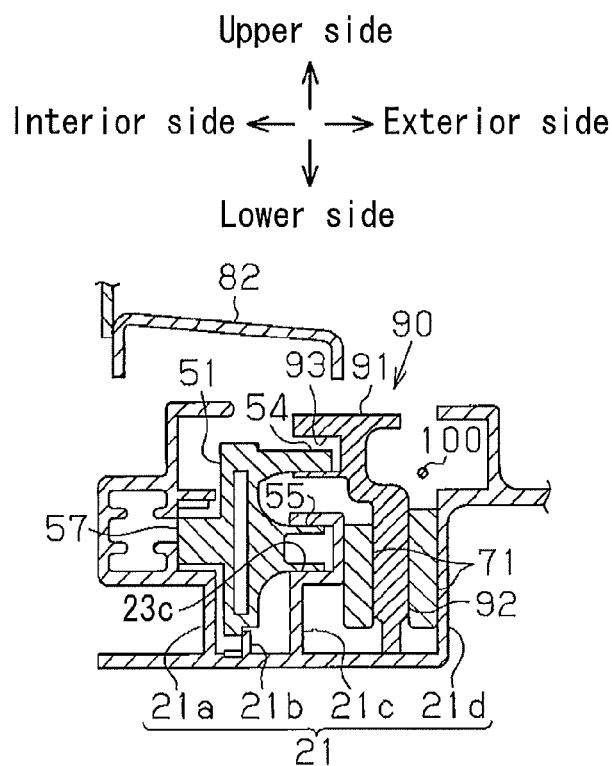
FIG. 9A is a vertical cross-sectional view taken along the line IXA-IXA in FIG. 2.
Figure 9B:
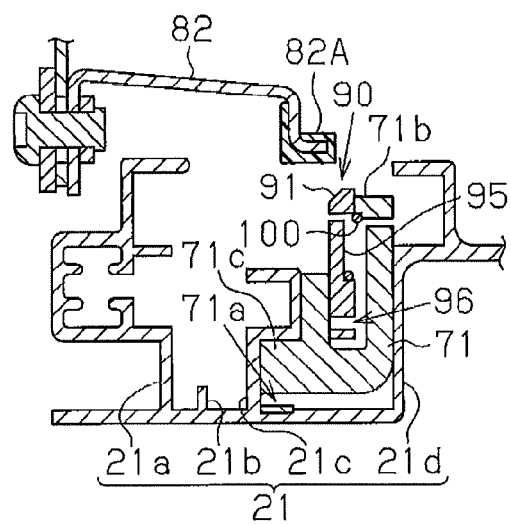
FIG. 9B is a vertical cross-sectional view taken along the line IXB-IXB in FIG. 2.
Figure 9C:
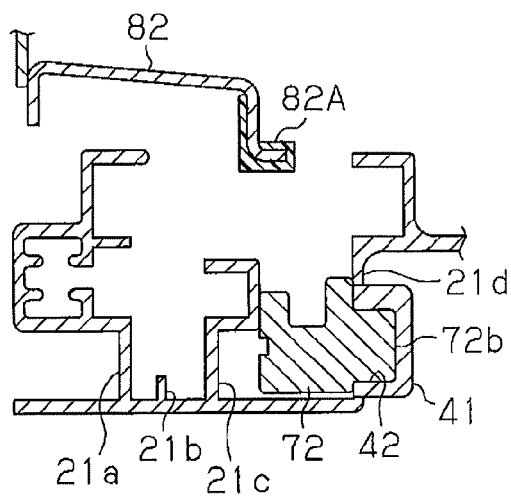
FIG. 9C is a vertical cross-sectional view taken along the line IXC-IXC in FIG. 2.
Figure 9D:
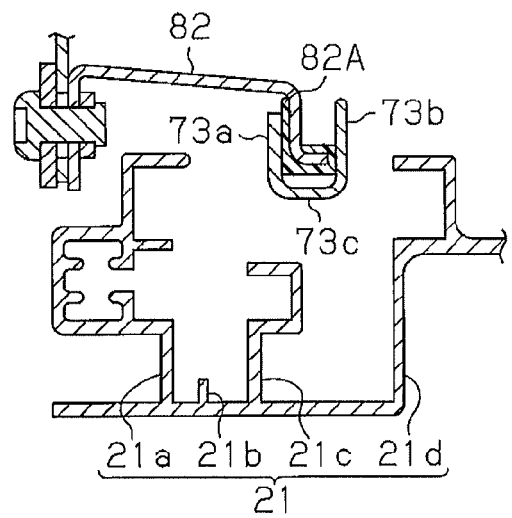
FIG. 9D is a vertical cross-sectional view taken along the line IXD-IXD in FIG. 3.

As illustrated in each of FIGS. 4 and 8A, a hole is formed in a front end portion of the arm portion 81 of the functional bracket 80. Upper and lower holes (hereinafter referred to as first and second holes, respectively) are formed in the front end portion of the main body 61 of the front link 60. A first guide pin 62a is press-fitted to the first hole of the front end portion of the main body 61 so as to protrude toward the interior side in the width direction. In addition, the first guide pin 62a is inserted in the hole of the functional bracket 80 in a state where the front link 60 is arranged at an exterior side of the functional bracket 80 in the width direction so as to be arranged parallel to the functional bracket 80 in an overlapping manner; thereby, the functional bracket 80 is rotatable relative to the front link 60 about the first guide pin 62a.

A second guide pin 62b (see FIG. 4) is press-fitted into the second hole of the front end portion of the main body 61 of the front link 60 so as to protrude toward the exterior side in the width direction. A third hole is formed in an intermediate portion of the main body 61 of the front link 60 in the longitudinal direction. A third guide pin 62c serving as a front restriction portion is press-fitted to the third hole of the intermediate portion of the main body 61 so as to protrude toward the exterior side (see FIG. 8C). A fourth hole is formed in the rear end portion of the main body 61. A fourth guide pin 62d serving as a rear restriction portion is press-fitted to the fourth hole of the rear end portion of the main body 61 so as to protrude toward the interior side (see FIG. 8D). In addition, a fifth hole is formed in the main body 61 so as to be positioned between the third guide pin 62c and the fourth guide pin 62d. A fifth guide pin 62e (see FIG. 4) is press-fitted to the fifth hole of the main body 61 so as to protrude toward the interior side.

When the front link 60 moves rearward, the front guide member 30 guides the functional bracket 80 and the front portion of the front link 60 so as to move the functional bracket 80 and the front portion of the front link 60 upward.

The front guide member 30 includes interior and exterior wall portions 31 and 33 each having a substantially C-shape in cross section. The exterior wall portion 33 is positioned at an exterior side of the interior wall portion 31 in the width direction (for the interior wall portion 31, see FIG. 8A). As illustrated in FIG. 8A, the interior wall portion 31 includes an interior guide groove 32. The interior guide groove 32 corresponding to an inner wall surface of the interior wall portion 31 has an opening facing the exterior side in the width direction. The first guide pin 62a is inserted in the interior guide groove 32. Meanwhile, the exterior wall portion 33 includes an exterior guide groove 34 positioned at a lower side of the interior guide groove 32 (see FIGS. 2 and 4). The exterior guide groove 34 corresponding to an inner wall surface of the exterior wall portion 33 has an opening facing the interior side in the width direction. The second guide pin 62b is inserted in the exterior guide groove 34. As described above, both the first guide pin 62a and the second guide pin 62b are arranged at the front guide member 30 so as to be inserted in the interior guide groove 32 and the exterior guide groove 34, respectively. The first guide pin 62a and the second guide pin 62b are movably guided by the interior guide groove 32 and the exterior guide groove 34, respectively, in conjunction with the longitudinal movement of the drive shoe 50.

In particular, as illustrated in FIG. 4, the interior guide groove 32 includes a front end portion that is closed, a vertically extending portion 32a vertically extending from the front end portion, and a circular arc portion 32b extending obliquely rearward and upward from an upper end portion of the vertically extending portion 32a. The exterior guide groove 34 includes a front end portion that is closed, a vertically extending portion 34a vertically extending from the front end portion, and a circular arc portion 34b extending obliquely rearward and upward from an upper end portion of the vertically extending portion 34a. Rear end portions of the interior guide groove 32 and the exterior guide groove 34 are opened. A guide width (vertical distance) at a rear end portion of the circular arc portion 32b is designed to be smaller than a guide width (vertical distance) at a front end portion of the circular arc portion 32b. The front end portion of the exterior guide groove 34 protrudes toward a lower side of a guide surface 21 of the guide rail 20. The guide surface 21 includes first, second, third, and fourth wall portions 21a, 21b, 21c, and 21d as will be described below (for example, refer to FIGS. 8B, 8C, and 8D).

In a state where the movable panel 12 is in a fully closed position as illustrated in FIG. 4, the first guide pin 62a is positioned further forward and further upward than the second guide pin 62b. In addition, the third guide pin 62c and the fifth guide pin 62e are arranged at the same position in the vertical direction and are positioned further upward than the first guide pin 62a. The fourth guide pin 62d is positioned further upward than the third guide pin 62c and the fifth guide pin 62e.

As illustrated in FIG. 5, the drive shoe 50 includes a main body 51 having a substantially flat plate shape and an approximately rectangular cross section. A guide hole 52 is formed in the main body 51 so as to penetrate therethrough in the width direction. The entire guide hole 52 has a shape extending in the longitudinal direction from a front end portion to a rear end portion of the main body 51. The guide hole 52 is formed by a vertically extending portion 52a, first and second inclined portions 52b and 52c, and a horizontal portion 52d.

The vertically extending portion 52a is positioned close to a lower end surface of the main body 51 so as to extend upward from the lower end surface. The first inclined portion 52b extends obliquely upward from an upper end portion of the vertically extending portion 52a toward a rear side of the main body 51. The second inclined portion 52c extends obliquely upward from a rear end portion of the first inclined portion 52b toward the rear side of the main body 51. The inclination of the second inclined portion 52c is slightly smaller than the inclination of the first inclined portion 52b. The horizontal portion 52d horizontally extends from a rear end portion of the second inclined portion 52c toward the rear side of the main body 51.

Figure 8B:
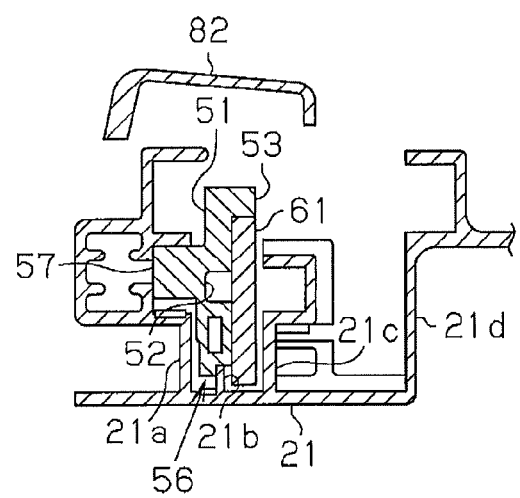
FIG. 8B is a vertical cross-sectional view taken along the line VIIIB-VIIIB in FIG. 2.

As illustrated in FIG. 5, the fourth guide pin 62d of the front link 60 is inserted in the guide hole 52 and the front link 60 moves in the longitudinal direction in conjunction with the longitudinal movement of the drive shoe 50. As illustrated in FIGS. 5 and 8B, a restriction pin 53 is arranged at an upper end of the front end portion of the main body 51. In particular, the restriction pin 53 is arranged at an upper side of the first inclined portion 52b of the guide hole 52 so as to protrude toward the exterior side in the width direction. The restriction pin 53 is positioned at an upper side of the main body 61 of the front link 60, thereby restricting the front link 60 from moving upward.

As illustrated in FIGS. 5 and 9A, an engagement pin 54 serving as a shaft portion is arranged at an upper end of the rear end portion of the main body 51. In particular, the engagement pin 54 is positioned further rearward than a rear end portion of the horizontal portion 52d so as to protrude toward the exterior side in the width direction. The engagement pin 54 is engageable with an engagement groove 93 of the check member 90 that will be described below.

As illustrated in FIGS. 5 and 9A, an annular portion 55 protruding toward the exterior side in the width direction is formed at the main body 51 so as to be positioned at a lower side of the engagement pin 54. The annular portion 55 is inserted in a recessed portion 23c (see FIG. 9A) of the third wall portion 21c that protrudes upward from the guide surface 21 of the guide rail 20 so as to extend in the longitudinal direction.

Figure 8C:
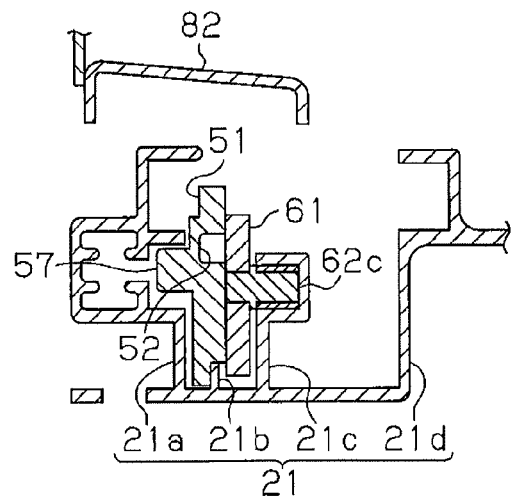
FIG. 8C is a vertical cross-sectional view taken along the line VIIIC-VIIIC in FIG. 2.
Figure 8D:
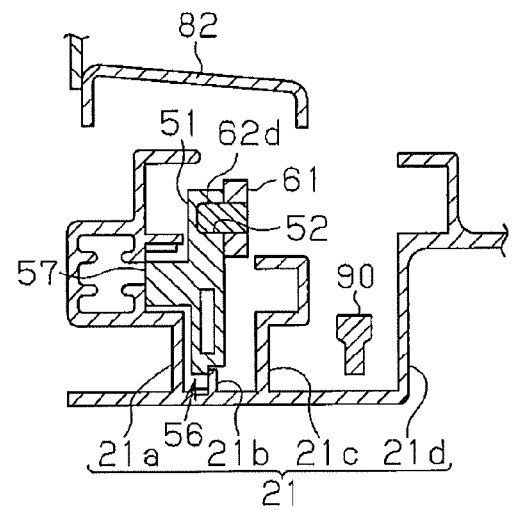
FIG. 8D is a vertical cross-sectional view taken along the line VIIID-VIIID in FIG. 2.

As illustrated in FIGS. 5, 8B, and 8D, through-holes are formed at a lower portion of the main body 51. Each of the through-holes penetrates in the width direction. A deformable portion 56 is formed by a thin-walled portion defined between the through-hole and a lower surface of the main body 51. The deformable portions 56 are arranged respectively at the front and rear end portions of the main body 51.

As illustrated in FIGS. 8B, 8C, 8D, and 9A, a convex guide portion 57 extending in the longitudinal direction is formed at the main body 51 so as to protrude toward the interior side in the width direction. The convex guide portion 57 is inserted in a recessed portion of the first wall portion 21a that protrudes upward from the guide surface 21 of the guide rail 20 so as to extend in the longitudinal direction.

As illustrated in FIGS. 6, 7A, 7B, and 7C, the check member 90 includes the main body 91 and the extending portion 92. The main body 91 is formed in an elongated shape extending in the longitudinal direction. The extending portion 92 has a strip shape curved downward from a front end portion of the main body 91 toward the guide surface 21 of the guide rail 20. Thus, the check member 90 as a whole is formed in a substantially L-shape.

As illustrated in FIGS. 6, 7A, 7C, and 9A, the engagement groove 93 is formed at the front end portion of the main body 91 so as to be recessed in an interior surface of the main body 91. The engagement groove 93 forms a substantially circular arc shape curved and extending obliquely upward toward a rear end portion of the main body 91 in a state where the engagement pin 54 is engaged with the engagement groove 93. A front end portion of the engagement groove 93 is closed while a rear end portion of the engagement groove 93 is opened. The engagement pin 54 of the drive shoe 50 is inserted through the rear end portion of the engagement groove 93 in the engagement groove 93 so as to engage therewith. In addition, an inclined guide surface 98 is formed at the front end portion of the main body 91 so as to extend obliquely downward toward the rear end portion of the main body 91. As illustrated in FIGS. 7A and 7C, a connecting surface 99 connecting the inclined guide surface 98 and the engagement groove 93 to each other is formed therebetween.

As illustrated in FIGS. 6, 7A, 7C, a recessed engagement portion 94 is formed at the rear end portion of the main body 91 so as to be receded in an exterior surface of the main body 91. A lower end portion of the recessed engagement portion 94 is closed while an upper end portion of the recessed engagement portion 94 is opened. A convex engagement portion 72a (see FIGS. 6, 11, 15, and 16) of the rear link 70 that will be described below is inserted through the upper end portion of the recessed engagement portion 94 so as to engage therewith. The check member 90 is rotatable about the recessed engagement portion 94 relative to the rear link 70.

As illustrated in FIGS. 6, 7A, 7C, and 9B, a recessed attachment portion 95 (recessed portion) is formed in an intermediate portion of the main body 91 in the longitudinal direction so as to extend therealong. A spring 100 serving as a biasing member having a substantially U-shape is attached to the recessed attachment portion 95 in a compressed manner. A curved portion 103 of the spring 100 corresponding to a compression spring is positioned close to a rear edge of the recessed attachment portion 95. As illustrated in FIG. 7A, a base end portion (first end portion) 101 of the spring 100 is inserted in and attached to an attachment hole 91a formed in the main body 91 (the base end portion 101 of the spring 100 is located on the left side in FIG. 7A). As illustrated in FIG. 7A, a temporary fixation portion 97 is formed at the main body 91 (the recessed attachment portion 95) so as to be positioned at an upper side of the attachment hole 91a. A fixation portion (second end portion) 102 of the spring 100 is temporally fixed to the temporary fixation portion 97.

As illustrated in FIGS. 6 and 9B, the fixation portion 102 of the spring 100 is engaged with (a protruding lock portion 71b of) the rear link 70 in a state where the check member 90 and the rear link 70 are attached to each other (the protruding lock portion 71b will be described below).

As illustrated in FIGS. 6 and 9A, the extending portion 92 is formed at the check member 90 so as to extend in a direction that is perpendicular to a line connecting the engagement groove 93 to the recessed engagement portion 94. That is, the extending portion 92 has a shape extending in a direction toward the guide surface 21 of the guide rail 20. The extending portion 92 is slidably arranged on the guide surface 21. In addition, the extending portion 92 includes a lower surface (edge portion) facing the guide surface 21 and the lower surface of the extending portion 92 includes a circular arc surface 92a formed in a substantially circularly curved shape having a radius extending from the engagement groove 93.

A deformable portion 96 having a shape similar to the shape of the deformable portion 56 of the drive shoe 50 is formed at the lower surface of the main body 91. As illustrated in FIGS. 6 and 9A, the rear link 70 includes a front portion 71, an intermediate portion 72, and a rear portion 73. The front portion 71 and the intermediate portion 72 as a whole have an elongated shape extending in the longitudinal direction. In addition, the rear portion 73 extending obliquely rearward and upward from a rear end portion of the intermediate portion 72 is formed so as to support the check member 90 in a covering manner from interior and exterior sides of the check member 90 in the width direction.

As illustrated in FIGS. 6 and 9B, a deformable portion 71a is formed at a lower surface of the front portion 71 of the rear link 70. The deformable portion 71a has a shape similar to the shape of the deformable portion 56 of the drive shoe 50. In addition, the protruding lock portion 71b is formed at the front portion 71 of the rear link 70. The protruding lock portion 71b protruding upward is curved so as to protrude toward the interior side in the width direction. The spring 100 is engaged with a lower surface of the protruding lock portion 71b.

The convex engagement portion 72a is arranged at the intermediate portion 72 of the rear link 70 so as to protrude from an interior surface of the intermediate portion 72 toward the interior side in the width direction. That is, the convex engagement portion 72a protrudes from the interior surface of the intermediate portion 72 toward the recessed engagement portion 94 of the check member 90. As described above, the convex engagement portion 72a is inserted in the recessed engagement portion 94; thereby, the rear link 70 and the check member 90 are engaged with each other.

As illustrated in FIGS. 6 and 9C, a convex insertion portion 72b serving as a rear restriction portion is formed at the intermediate portion 72 so as to protrude from an exterior surface of the intermediate portion 72 toward the exterior side in the width direction. Here, the rear end portion of the front link 60 is positioned further forward than the convex insertion portion 72b (see FIG. 2).

As illustrated in FIGS. 3, 6, and 9D, the rear portion 73 of the rear link 70 includes vertical wall portions 73a and 73b at interior and exterior sides, respectively (the vertical wall portions 73a and 73b will be hereinafter referred to as an interior-side vertical wall portion 73a and an exterior-side vertical wall portion 73b, respectively), and a connecting bottom portion 73c connecting the interior-side vertical wall portion 73a to the exterior-side vertical wall portion 73b. An exterior side edge of the support portion 82 of the functional bracket 80 is supported by the interior-side vertical wall portion 73a, the exterior-side vertical wall portion 73b, and the connecting bottom portion 73c from a lower side of the functional bracket 80 so as to slide along the longitudinal direction. In addition, a slider 82A made of resin is slidably fixed to the exterior side edge of the support portion 82 in the longitudinal direction.

As illustrated in FIGS. 6 and 9C, a recessed guide portion 42 is formed at a main body 41 of the rear guide member 40 so as to be recessed in an interior surface of the main body 41 in the width direction. The interior surface of the main body 41 extends in the longitudinal direction. The recessed guide portion 42 is formed so as to be inclined obliquely upward from a front portion to a rear portion of the main body 41 of the rear guide member 40. The convex insertion portion 72b of the rear link 70 is inserted in the recessed guide portion 42.

The rear guide member 40 is arranged at a substantially intermediate portion of the guide rail 20 in the longitudinal direction. A lock hole 21e is formed in the guide surface 21 of the guide rail 20 so as to be arranged at a position corresponding to a predetermined distance rearward from a position of the drive shoe 50 at the time when the movable panel 12 is in the fully closed position. The lock hole 21e partially recessed in the guide surface 21 is positioned in the longitudinal direction so as to face the rear guide member 40. The extending portion 92 of the check member 90 is engageable with the lock hole 21e. The lock hole 21e serves as a restriction portion and a lock portion of the sunroof apparatus 10 according to the embodiment.

In the sunroof apparatus 10 described above, in a state where the movable panel 12 is in the fully closed position, the front link 60 is restricted via the first guide pin 62a by an inner edge portion of the vertical extending portion 32a of the interior guide groove 32 (of the front guide member 30) from moving in the longitudinal direction.

As illustrated in FIG. 8C, the front link 60 is restricted via the third guide pin 62c (serving as the front restriction portion) by the third wall portion 21c of the guide rail 20 from vertically moving. In addition, as illustrated in FIG. 8D, the front link 60 is restricted via the fourth guide pin 62d by an inner edge portion of the guide hole 52 of the drive shoe 50 from vertically moving.

As illustrated in FIG. 9B, the rear link 70 includes an interiorly protruding portion 71c serving as a front restriction portion. The rear link 70 is restricted via the interiorly protruding portion 71c by the third wall portion 21c of the guide rail 20 from vertically moving. In addition, as illustrated in FIG. 9C, the rear link 70 is restricted via the convex insertion portion 72b (the rear restriction portion) by an inner edge portion of the recessed guide portion 42 of the rear guide member 40 from vertically moving.

Next, the tilt-up operation of the movable panel 12 will be explained as follows with reference to FIGS. 10, 11, 12A, 12B, 12C, 12D, 13A, 13B, 13C, and 13D. FIG. 10 illustrates a vertical cross-sectional view of the front side of the sunroof apparatus 10 in a fully tilted-up state. FIG. 11 illustrates a vertical cross-sectional view of the rear side of the sunroof apparatus 10 in the fully tilted-up state. In addition, in FIGS. 10 and 11, the components of the sunroof apparatus 10 are shown by different types of lines from one another in the same way as seen in FIGS. 2 and 3.

Figure 13A:
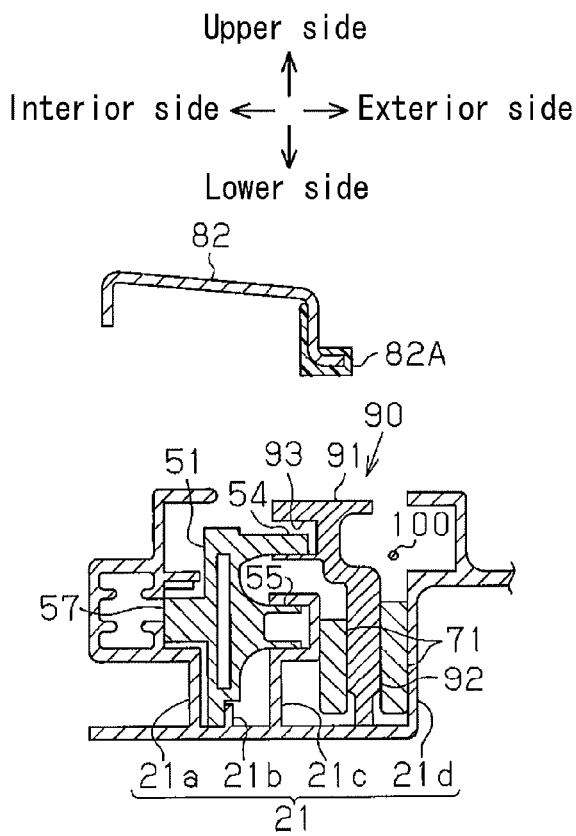
FIG. 13A is a vertical cross-sectional view taken along the line XIIIA-XIIIA in FIG. 10.
Figure 13B:
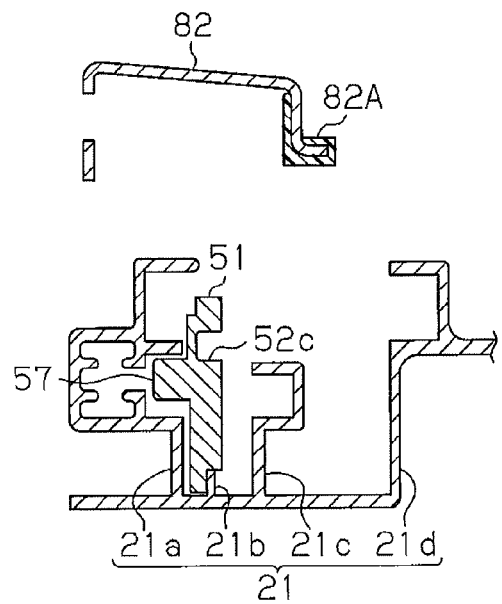
FIG. 13B is a vertical cross-sectional view taken along the line XIIIB-XIIIB in FIG. 10.
Figure 13C:
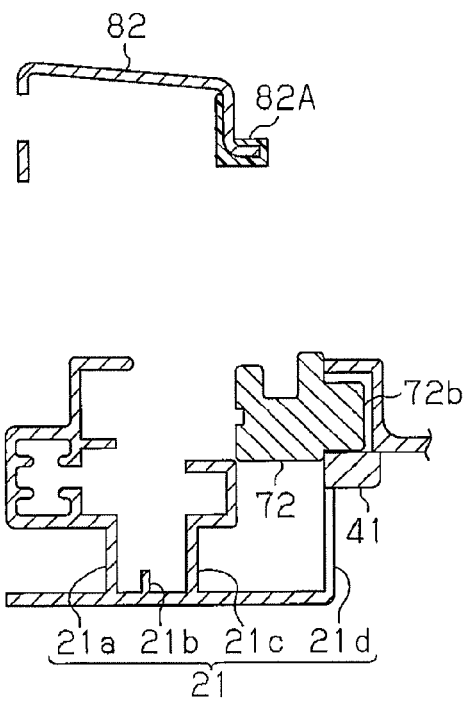
FIG. 13C is a vertical cross-sectional view taken along the line XIIIC-XIIIC in FIG. 11.
Figure 13D:
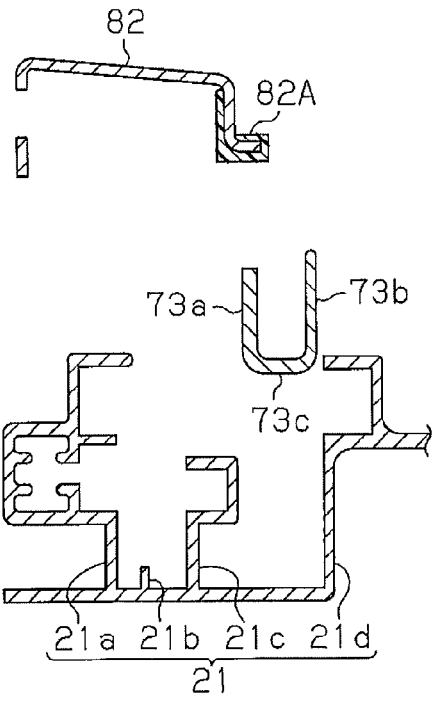
FIG. 13D is a vertical cross-sectional view taken along the line XIIID-XIIID in FIG. 11.

FIGS. 12A, 12B, 12C, and 12D illustrate vertical cross-sectional views taken along the lines XIIA-XIIA, XIIB-XIIB, XIIC-XIIC, and XIID-XIID of FIG. 10. FIGS. 13A and 13B illustrate vertical cross-sectional views taken along the lines XIIIA-XIIIA and XIIIB-XIIIB of FIG. 10. FIGS. 13C and 13D illustrate vertical cross-sectional views taken along the lines XIIIC-XIIIC and XIIID-XIIID of FIG. 11.

As illustrated in FIG. 10, for example, the drive shoe 50 moves rearward; therefore, the fourth guide pin 62d is guided within the guide hole 52 (the drive shoe 50) and therefore is positioned at a front end portion of the second inclined portion 52c (see FIG. 12D). At this time, the fourth guide pin 62d does not move in the longitudinal direction but moves downward. Therefore, the front link 60 rotates clockwise about the third guide pin 62c in FIG. 10; thereby, the front end portion of the functional bracket 80 is moved upward by the first guide pin 62a to which the front end portion of the functional bracket 80 is connected (see FIG. 12A).

As described above, the drive shoe 50 and the check member 90 are connected to each other by the engagement pin 54 and the engagement groove 93 (see FIG. 13A). In addition, the check member 90 and the rear link 70 are connected to each other by the recessed engagement portion 94 and the convex engagement portion 72a (see FIG. 11). Accordingly, the check member 90 and the rear link 70 move rearward in conjunction with the rearward movement of the drive shoe 50. Here, the interiorly protruding portion 71c of the rear link 70 moves within the guide rail 20 in the longitudinal direction when the movable panel 12 moves from the fully closed position to a fully opened position. Meanwhile, the convex insertion portion 72b of the rear link 70 is being guided by the recessed guide portion 42 of the rear guide member 40 in the longitudinal direction, thereby moving from the front portion to the rear portion of the main body 41 and from a lower side to an upper side of the main body 41. Accordingly, the rear portion 73 of the rear link 70 moves upward in accordance with the upward movement of the convex insertion portion 72b and the functional bracket 80 having a rear portion supported by the rear portion 73 of the rear link 70 moves upward. Consequently, a rear portion of the movable panel 12 is moved upward; therefore, the movable panel 12 is tilted forward. That is, the movable panel 12 is brought into the tilted-up state.

Figure 14:
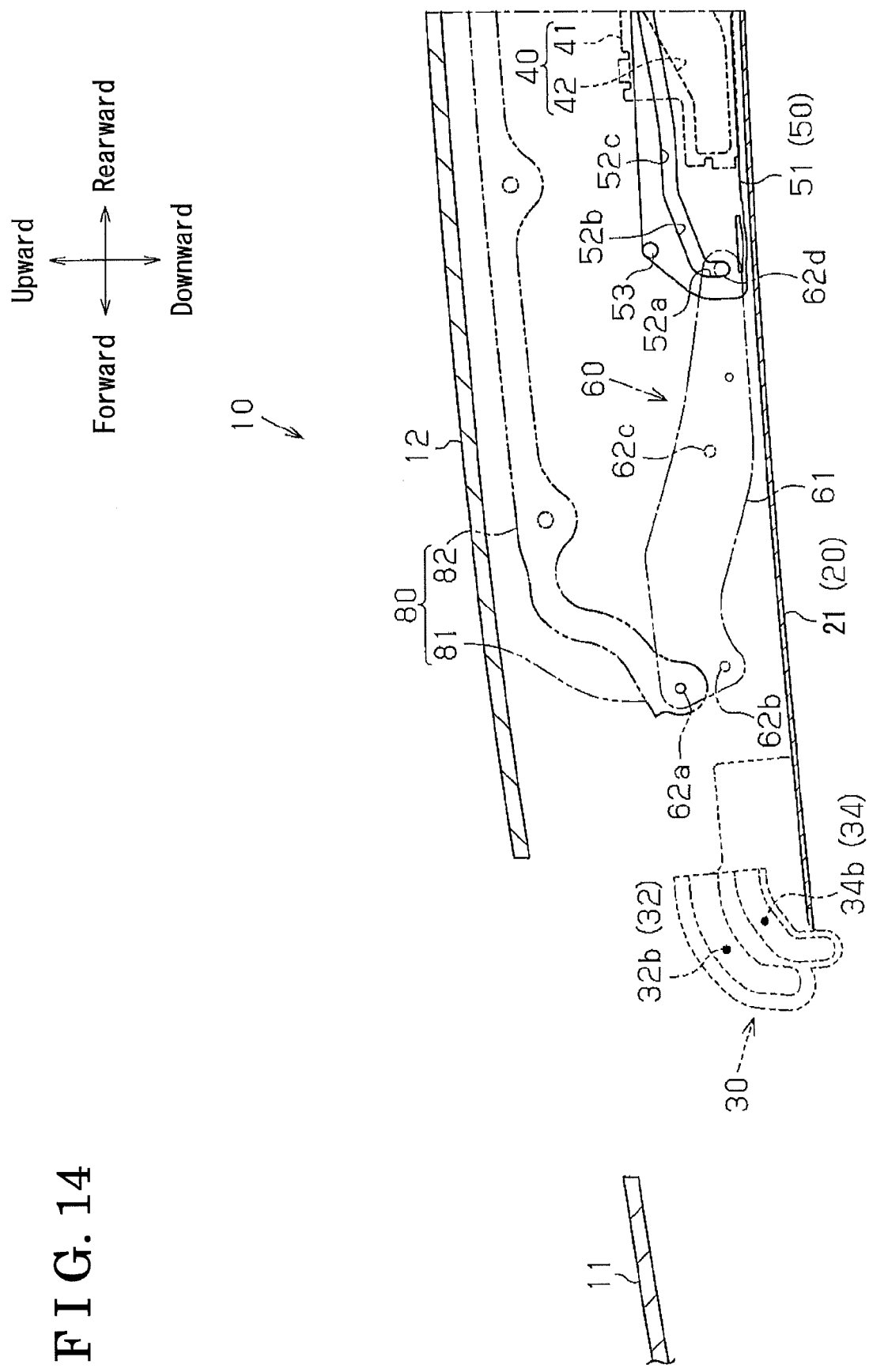
FIG. 14 is a vertical cross-sectional view illustrating the front side of the sunroof apparatus when being in a state immediately after the drive shoe and the check member are disengaged from each other.
Figure 15:
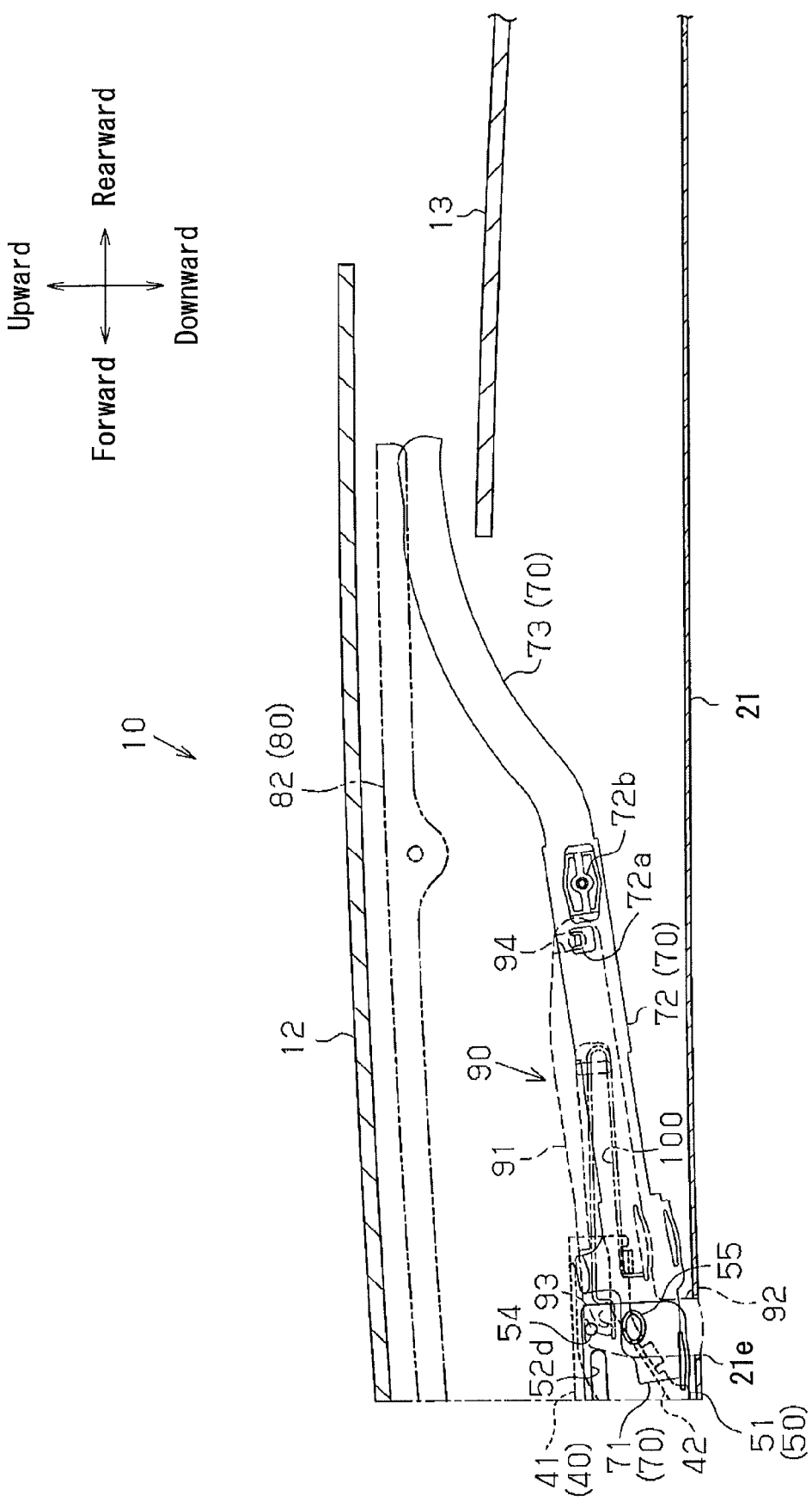
FIG. 15 is a vertical cross-sectional view illustrating the rear side of the sunroof apparatus when being in a state immediately after the drive shoe and the check member are disengaged from each other.

Next, disengagement between the drive shoe 50 and the check member 90 will be described as follows with reference to FIGS. 14 and 15. FIG. 14 illustrates a vertical cross-sectional view of the front side of the sunroof apparatus 10 when being in a state right after the drive shoe 50 and the check member 90 are disengaged from one another. FIG. 15 illustrates a vertical cross-sectional view of the rear side of the sunroof apparatus 10 when being in a state right after the drive shoe 50 and the check member 90 are disengaged from one another. In FIGS. 14 and 15, the components of the sunroof apparatus 10 are shown by different types of lines from one another in the same way as seen in FIGS. 2 and 3.

As illustrated in FIG. 14, the drive shoe 50 moves rearward; therefore, the fourth guide pin 62d moves within the guide hole 52 of the drive shoe 50 relative thereto and therefore reaches a lower end portion of the vertical extending portion 52a. At this time, the rear end portion of the front link 60 is moved downward and rearward. Consequently, the front link 60 rotates clockwise about the third guide pin 62c as seen in FIG. 14 and moves rearward in conjunction with the rearward movement of the drive shoe 50. Then, the first guide pin 62a is removed from the rear end portion of the circular arc portion 32b of the front guide member 30 and the second guide pin 62b is removed from a rear end portion of the circular arc portion 34b of the front guide member 30. In addition, the first guide pin 62a and the second guide pin 62b move rearward along the guide rail 20.

As illustrated in FIGS. 14 and 15, the drive shoe 50 is moved rearward by the predetermined distance from the position at the time when the movable panel 12 is in the fully closed position. At this time, the extending portion 92 of the check member 90 is moved to an upper side of the lock hole 21e of the guide rail 20. The check member 90 is biased by the spring 100 in a direction toward the guide surface 21 of the guide rail 20; therefore, the check member 90 rotates counterclockwise in FIG. 15 and the extending portion 92 is moved downward into the lock hole 21e. As a result, the engagement pin 54 is removed from the engagement groove 93, therefore releasing the engagement between the drive shoe 50 and the check member 90.

Figure 16:
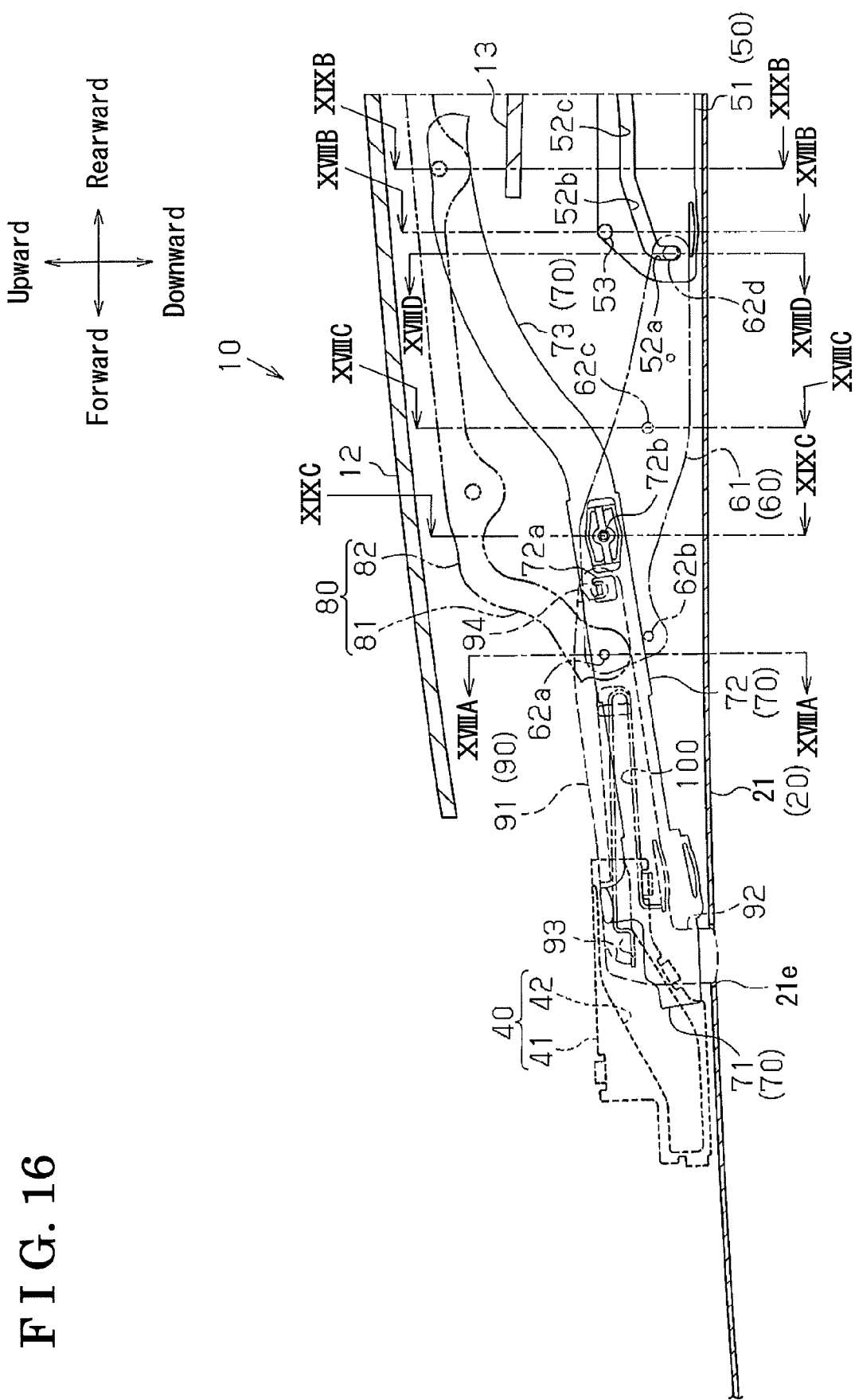
FIG. 16 is a vertical cross-sectional view illustrating the front side of the sunroof apparatus in the fully opened state.
Figure 17:
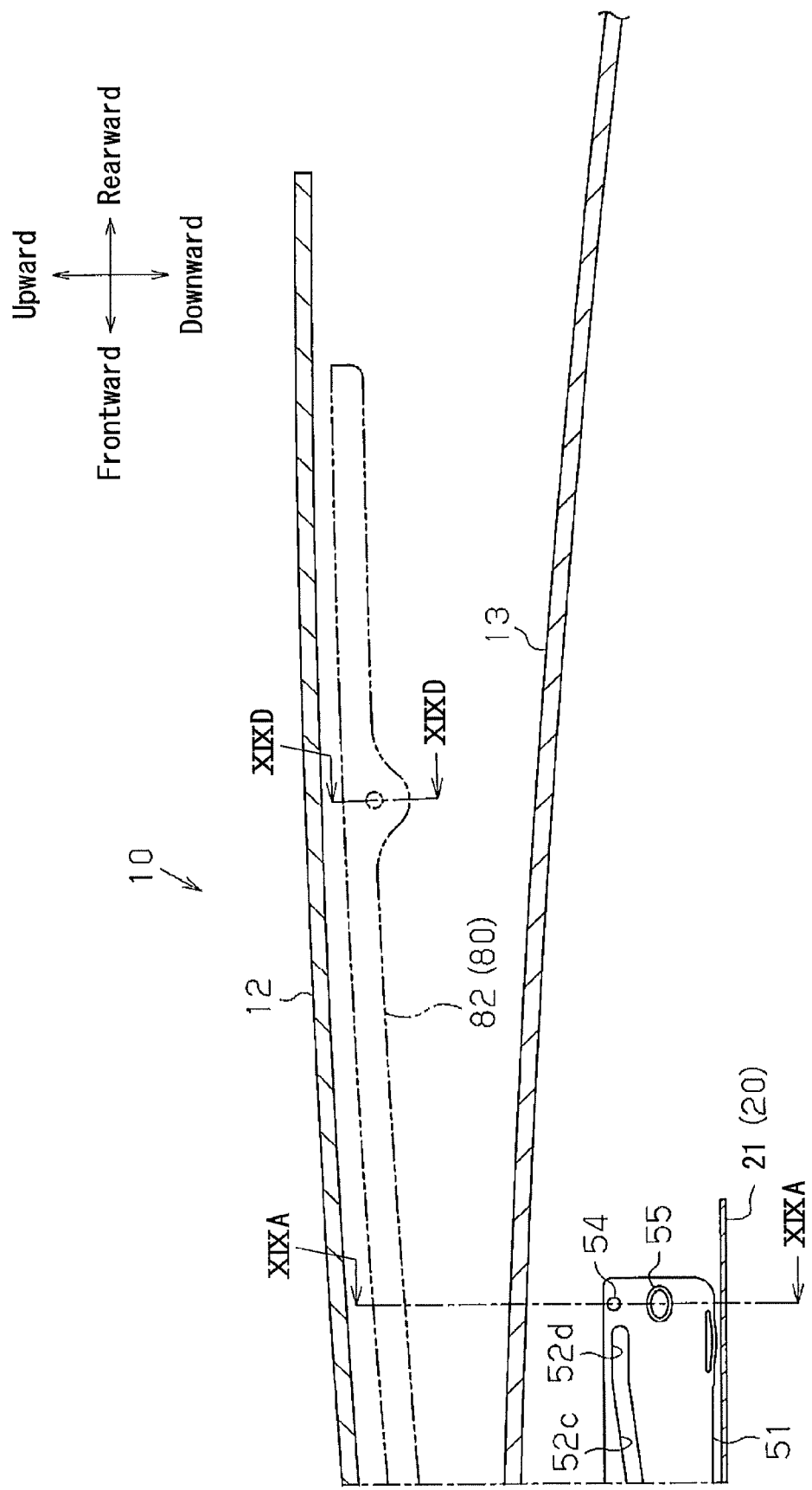
FIG. 17 is a vertical cross-sectional view illustrating the rear side of the sunroof apparatus in the fully opened state.

Next, a configuration of the sunroof apparatus 10 in the fully opened state will be explained as follows with reference to FIGS. 16, 17, 18A, 18B, 18C, 18D, 19A, 19B, 19C, and 19D. FIG. 16 illustrates a vertical cross-sectional view of the front side of the sunroof apparatus 10 in the fully opened state. FIG. 17 illustrates a vertical cross-sectional view of the rear side of the sunroof apparatus 10 in the fully opened state. In addition, in FIGS. 17 and 18, the components of the sunroof apparatus 10 are shown by different types of lines from one another in the same way as seen in FIGS. 2 and 3.

In addition, FIGS. 18A, 18B, 18C, and 18D illustrate vertical cross-sectional views taken along the lines XVIIIA-XVIIIA, XVIIIB-XVIIIB, XVIIIC-XVIIIC, and XVIIID-XVIIID of FIG. 16. FIGS. 19B and 19C illustrate vertical cross-sectional views taken along the lines XIXB-XIXB and XIXC-XIXC of FIG. 16. FIGS. 19A and 19D illustrate vertical cross-sectional views taken along the lines XIXA-XIXA and XIXD-XIXD of FIG. 17.

After the extending portion 92 of the check member 90 is moved downward into the lock hole 21e as illustrated in FIG. 16, the drive shoe 50 moves further rearward. At this time, the front link 60 connected to the drive shoe 50 by the fourth guide pin 62d moves rearward in conjunction with the rearward movement of the drive shoe 50. Here, the first guide pin 62a moves rearward along the recessed portion formed in the first wall portion 21a of the guide rail 20 (see FIG. 18A). Both the second guide pin 62b and the third guide pin 62c move rearward along the recessed portion 23c formed in the third wall portion 21c of the guide rail 20 (see FIG. 18C). The first, second, and third guide pins 62a, 62b, and 62c that are separated from one another in the longitudinal direction restrict the front link 60 from moving vertically.

In addition, the functional bracket 80 is connected to the front link 60 by the first guide pin 62a, thereby moving rearward in accordance with the rearward movement of the front link 60. At this time, both the rear link 70 and the check member 90 are stopped in the longitudinal direction; therefore, the front end portion of the front link 60 moves rearward to a position corresponding to the position of the intermediate portion 72 of the rear link 70 in the longitudinal direction. The convex insertion portion 72b of the rear link 70 moves rearward along a recessed portion 23d formed in the fourth wall portion 21d of the guide rail 20 and the recessed portion 23d restricts the convex insertion portion 72b from moving vertically (see FIG. 19C).

As illustrated in FIG. 16, the drive shoe 50 is positioned at a lower side of the rear portion 73 of the rear link 70. In addition, a front end portion of the fixed panel 13 is positioned between the rear portion 73 and the drive shoe 50 in the vertical direction. The front link 60 and the rear link 70 are arranged at different positions from each other in the width direction (see FIGS. 18A, 18C, and 18D).

Here, for example, a distance between the convex insertion portion 72b of the rear link 70 and the third guide pin 62c of the front link 60 is defined as a first distance and a distance between the convex insertion portion 72b and the fourth guide pin 62d of the front link 60 is defined as a second distance. In a state where the movable panel 12 is in the fully closed position as illustrated in FIG. 2, the first distance is longer than the second distance. On the other hand, in a state where the movable panel 12 is in the fully opened position as illustrated in FIG. 16, the first distance is shorter than the second distance.

As illustrated in FIG. 16, the convex insertion portion 72b is positioned further forward than the rear end portion of the front link 60. The front end portion of the front link 60 is positioned further rearward than a front end portion of the rear link 70.

As described above, in a state where the movable panel 12 is in the fully opened position, the front link 60 is restricted via the fourth guide pin 62d by the inner edge portion of the vertically extending portion 52a of the guide hole 52 from moving in the longitudinal direction as illustrated in FIG. 16.

As illustrated in FIG. 18A, the front link 60 is restricted via the first guide pin 62a by the first wall portion 21a of the guide rail 20 from vertically moving. In addition, as illustrated in FIG. 16, the front link 60 is restricted by the second guide pin 62b from vertically moving from the guide rail 20. Moreover, as illustrated in FIG. 18C, the front link 60 is restricted via the third guide pin 62c by the third wall portion 21c of the guide rail 20 from vertically moving.

Similarly as seen in a state where the movable panel 12 is in the fully closed position, under a state where the movable panel 12 is in the fully opened position, the rear link 70 is restricted via the interiorly protruding portion 71c by the third wall portion 21c of the guide rail 20 from vertically moving (see FIG. 9B). Additionally, as illustrated in FIG. 19C, the rear link 70 is restricted via the convex insertion portion 72b (serving as the rear restriction portion) by an inner edge portion of the recessed portion 23d of the fourth wall portion 21d of the guide rail 20 from vertically moving.

Next, how to assemble the check member 90, the rear link 70, and the drive shoe 50 to one another will be explained as follows. According to the sunroof apparatus 10 of the embodiment, the spring 100 is firstly attached to the check member 90 in a state where the check member 90 is not attached to the guide rail 20. Then, the rear link 70 is attached to the check member 90 to which the spring 100 is attached. Afterward, the spring 100, the check member 90, and the rear link 70 that are attached to one another are assembled to the guide rail 20. In particular, the fixation portion 102 of the spring 100 is temporally fixed to the temporary fixation portion 97; thereby, the spring 100 is attached to the recessed attachment portion 95 of the check member 90. Secondly, the convex engagement portion 72a of the rear link 70 is engaged with the recessed engagement portion 94 of the check member 90 to thereby attach the rear link 70 to the check member 90. Afterward, the fixation portion 102 of the spring 100 is detached from the temporary fixation portion 97 and is thereafter locked with the protruding lock portion 71b of the rear link 70. Next, the check member 90, the rear link 70, and the spring 100 attached to one another as described above are assembled to the guide rail 20. In addition, the drive shoe 50 is assembled to the guide rail 20 so as to be positioned further forward than the check member 90.

Thereafter, the drive shoe 50 is moved rearward along the guide rail 20; therefore, the engagement pin 54 of the drive shoe 50 makes contact with the inclined guide surface 98 of the check member 90. Accordingly, the check member 90 rotates about the convex engagement portion 72a of the rear link 70; therefore, the engagement pin 54 moves along the connecting surface 99. Afterward, the drive shoe 50 is moved forward; thereby, the engagement pin 54 moves in the engagement groove 93 and is therefore engaged therewith. Thus, the check member 90 and the drive shoe 50 are attached to each other.

The sunroof apparatus 10 according to the embodiment may be modified as follows. According to the sunroof apparatus 10 of the embodiment, it is appropriate for the temporary fixation portion 97 to be formed at the check member 90 in order to improve assemblability between the check member 90 and the rear link 70. Alternatively, the temporary fixation portion 97 may not be formed at the check member 90 in the sunroof apparatus 10 according to the embodiment.

According to the sunroof apparatus 10 of the embodiment, the recessed attachment portion 95 to which the spring 100 is attached is formed at the check member 90. Alternatively, the recessed attachment portion 95 may be modified to a convex portion or the like, which has a different configuration from that of the recessed attachment portion 95, as long as the spring 100 may be attached to the convex portion or the like.

The biasing member according to the embodiment is not limited to the spring 100 having the substantially U-shape. Alternatively, the biasing member according to the embodiment may be formed by a different biasing member, for example, a coil spring or the like as long as the different biasing member biases the check member 90 in the direction toward the lock hole 21e (the restriction portion, the lock portion) of the guide surface 21.

According to the sunroof apparatus 10 of the embodiment, it is appropriate for the deformable portion 96 to be integrally formed with the lower surface of the main body 91 of the check member 90 in order to simplify the assembling processes of the sunroof apparatus 10. However, in a case where the assembling processes are not intended to be simplified, an elastic portion serving as the deformable portion 96 and corresponding to a separate member from the main body 91 may be arranged thereat.

According to the sunroof apparatus 10 of the embodiment, the extending portion 92 includes the edge portion facing the guide rail 20 (guide surface 21). In addition, it is appropriate for the edge portion of the extending portion 92 to have the circular arc surface 92a in order to reduce an interference length of the extending portion 92 with the lock hole 21e in the vertical direction, i.e. in order to reduce a length of the lock hole 21e in the vertical direction. Alternatively, the check member 90 may not have the circular arc surface 92a and may be formed to have both curved and flat surfaces.

According to the sunroof apparatus 10 of the embodiment, the check member 90 is configured to include the extending portion 92. Alternatively, the check member 90 may not include the extending portion 92. In addition, according to the embodiment, the lock hole 21e serving as the restriction portion is formed in the guide rail 20. Alternatively, the restriction portion may be a different portion from the lock hole 21e as long as the different portion may release the engagement between the check member 90 and the drive shoe 50 by engaging with the check member 90 to restrict the rearward movement of the check member 90.

Further, for example, in a case where an occurrence of noises caused by a contact between the check member 90 and the guide rail 20 is of no concern, the deformable portion 96 serving as the elastic portion may be eliminated from the check member 90. Furthermore, according to the sunroof apparatus 10 of the embodiment, the front guide member 30 and the rear guide member 40 are separate members from the guide rail 20. Alternatively, at least one of the front guide member 30 and the rear guide member 40 may be integrally formed with the guide rail 20, resulting in a decrease of the number of components of the sunroof apparatus 10.

As described above, a different member from the check member 90 may be applied to the sunroof apparatus 10 according to the embodiment as long as the different member is configured as follows. The different member is arranged on the guide rail 20 so as to engage with the drive shoe 50. In addition, in a case where a distance of the rearward movement of the drive shoe 50 is shorter than the predetermined distance, the different member is engaged with the drive shoe 50 to thereby move rearward together with the drive shoe 50. Meanwhile, in a case where the distance of the rearward movement of the drive shoe 50 is equal to or longer than the predetermined distance, the different member is disengaged from the drive shoe 50.

As described above, according to the sunroof apparatus 10 of the embodiment, following effects may be obtained.

According to the aforementioned embodiment, the sunroof apparatus 10 operates the movable panel 12 in the opening and closing directions. The movable panel 12 is arranged at the opening portion 2 of the roof panel 1 for the vehicle. The opening and closing operations includes tilt-up and slide modes of the movable panel 12. The sunroof apparatus 10 includes the functional bracket 80 supporting the movable panel 12, the guide rail 20 adapted to be attached to the roof panel 1, the guide rail 20 extending in the longitudinal direction of the vehicle, the drive shoe 50 driven to move along the guide rail 20 in the longitudinal direction, the front link 60 connected to the front portion of the functional bracket 80 to move in the longitudinal direction in conjunction with the movement of the drive shoe 50, the front guide member 30 engaged with the front portion of the functional bracket 80 and with the front portion of the front link 60 to guide the front portions of the functional bracket 80 and the front link 60 to move in the longitudinal direction, the check member 90 provided to be engageable with the drive shoe 50, the check member 90 being engaged with the drive shoe 50 to move rearward in conjunction with the movement of the drive shoe 50 in the rearward direction of the vehicle when the distance of the rearward movement of the drive shoe 50 is shorter than the predetermined distance, the check member 90 being disengaged from the drive shoe 50 when the distance of the rearward movement of the drive shoe 50 is equal to or longer than the predetermined distance, the rear link 70 engaged with the check member 90 to support a portion of the functional bracket 80 so that the portion is slidable in the longitudinal direction, the portion being positioned rearward than the front portion of the functional bracket 80, and the rear guide member 40 guiding the rear link 70 to move in the longitudinal direction.

According to the aforementioned configuration of the sunroof apparatus 10 of the embodiment, the drive shoe 50 and the check member 90 engage with each other and disengage from each other depending on the distance of the rearward movement of the drive shoe 50 from the position at the time when the movable panel 12 is in the fully closed position, thereby realizing the tilt-up and slide modes included in the opening and closing operations of the movable panel 12. Consequently, the guide rail 20 needs to be configured so that a length of the guide rail 20 in the longitudinal direction ranges from the front end portion of the guide rail 20 to the position of the drive shoe 50 at the time when the movable panel 12 is in the fully opened position. As a result, the length of the guide rail 20 in the longitudinal direction may be minimized without a reduction of a maximum opening area created by the movable panel 12.

According to the aforementioned embodiment, the sunroof apparatus 10 further includes the lock hole 21e arranged at the guide rail 20 and the spring 100 biasing the check member 90 in the direction toward the lock hole 21e. The check member 90 is provided rotatably about the engagement position with the rear link 70. The lock hole 21e engages with the check member 90 to restrict the rearward movement of the check member 90 to release the engagement between the check member 90 and the drive shoe 50.

As described above, the distance of the rearward movement of the drive shoe 50 becomes equal to or longer than the predetermined distance from the position at the time when the movable panel 12 is in the fully closed position. At this time, the check member 90 is moved downward into the lock hole 21e and is engaged therewith, thereby being restricted by the lock hole 21e from moving further rearward. Thus, the check member 90 engageable with and disengageable from the drive shoe 50 depending on the distance of the rearward movement of the drive shoe 50 may be easily configured.

According to the aforementioned embodiment, the check member 90 includes the extending portion 92 extending toward the lock hole 21e. The extending portion 92 slides on the guide surface 21 of the guide rail 20. The lock hole 21e serves as the lock portion partially recessed in the guide surface 21 of the guide rail 20 to lock with the extending portion 92.

When the check member 90 is moved rearward until the extending portion 92 is positioned to the upper side of the lock hole 21e, the check member 90 is rotated and the extending portion 92 is moved downward into the lock hole 21e formed in the guide rail 20. Therefore, the check member 90 is restricted from moving further rearward. Thus, the check member 90 engageable with and disengageable from the drive shoe 50 depending on the distance of the rearward movement of the drive shoe 50 may be easily configured.

According to the aforementioned embodiment, the drive shoe 50 includes the engagement pin 54 extending in the width direction of the vehicle. The check member 90 includes the engagement groove 93 having the rear end portion. The engagement groove 93 is engageable via the rear end portion with the engagement pin 54 of the drive shoe 50. The engagement groove 93 forms the circular arc shape extending obliquely upward and rearward in a state where the engagement groove 93 is engaged with the engagement pin 54.

For example, when the check member 90 is rotated in accordance with the rearward movement of the drive shoe 50 and the extending portion 92 is moved downward into the lock hole 21e formed in the guide rail 20, the engagement pin 54 of the drive shoe 50 moves within the engagement groove 93 and is thereafter released from the engagement groove 93 through the rear end portion of the engagement groove 93. Therefore, the engagement between the drive shoe 50 and the check member 90 is released.

According to the aforementioned embodiment, the extending portion 92 includes the edge portion facing the guide surface 21. The edge portion is formed in the circularly curved shape.

In particular, the check member 90 includes the circular arc surface 92a formed in the substantially circular arc shape having the radius extending radially outward from the engagement pin 54 that is the engagement position with the drive shoe 50. According to the configuration of the check member 90, the check member 90 smoothly rotates, that is, the extending portion 92 is smoothly moved downward into the lock hole 21e. Therefore, the extending portion 92 is appropriately locked by the lock hole 21e serving as the lock portion. In addition, according to the configuration of the check member 90, the interference length of the extending portion 92 with the lock hole 21e in the vertical direction, i.e. the length of the lock hole 21e in the vertical direction may be minimized.

According to the aforementioned embodiment, the check member 90 includes the elastic portion at the edge portion located in the direction toward which the check member 90 is biased by the spring 100.

According to the aforementioned embodiment, the elastic portion is the deformable portion 96 integrally formed with the main body 91 of the check member 90.

Accordingly, in a case where the check member 90 is moved downward into the lock hole 21e and is engaged therewith, the check member 90 is brought into contact with the guide rail 20 by the biasing force of the spring 100. At this time, the noises caused by the contact between the check member 90 and the guide rail 20 may discomfort an occupant or the like of the vehicle.

However, the check member 90 configured as described above may minimize the noises caused when the check member 90 is brought into contact with the guide rail 20 by the biasing force of the spring 100. Accordingly, the occupant may be inhibited from having uncomfortable feeling caused by the noises. In addition, according to the sunroof apparatus 10 of the embodiment, the deformable portion 96 is integrally formed with the check member 90. Accordingly, the assembling process of the sunroof apparatus 10 may be simplified compared to the case where the elastic portion corresponding to the deformable portion 96 and serving as the separate member from the check member 90 is applied to the sunroof apparatus 10.

According to the aforementioned embodiment, the check member 90 includes the recessed attachment portion 95 and the temporary fixation portion 97 formed at the recessed attachment portion 95. The spring 100 serves as the compression spring 100 arranged in the recessed attachment portion 95. The compression spring 100 includes the base end portion 101 engaged with the check member 90 and the fixation portion 102 engaged with the rear link 70. The fixation portion 102 of the compression spring 100 is temporarily fixed to the temporary fixation portion 97 when attaching the rear link 70 and the check member 90 to each other by the compression spring 100.

Therefore, in the case of attaching the rear link 70 to the check member 90, the fixation portion 102 of the spring 100 is firstly temporarily attached to the temporary fixation portion 97 of the recessed attachment portion 95. Then, the rear link 70 is attached to the check member 90. Afterward, the fixation portion 102 is detached from the temporary fixation portion 97 and is thereafter engaged with the rear link 70. Next, the check member 90, the rear link 70, and the spring 100 attached to one another as described above are assembled to the guide rail 20. Thus, the assemblability of the sunroof apparatus 10 according to the embodiment may be improved compared to a case where the check member 90 and the rear link 70 are attached to each other and the spring 100 is thereafter engaged with the check member 90 and the rear link 70. In addition, according to the sunroof apparatus 10 of the embodiment, the spring 100 is engaged with the check member 90 and the rear link 70 before the check member 90 and the rear link 70 are assembled to the guide rail 20. Therefore, the assemblability of the sunroof apparatus 10 according to the embodiment may be further increased compared to a case where the check member 90 and the rear link 70 are assembled to the guide rail 20 and the spring 100 is thereafter attached to the check member 90 and the rear link 70.

Further, according to the sunroof apparatus 10 of the embodiment, the front link 60 includes the third guide pin 62c (the front restriction portion) and the fourth guide pin 62d (the rear restriction portion) that are different pins separated from each other in the longitudinal direction. The third guide pin 62c and the fourth guide pin 62d are restricted by the guide rail 20 from moving vertically in a state where the movable panel 12 is in the fully closed position. The rear link 70 includes the interiorly protruding portion 71c (the front restriction portion) and the convex insertion portion 72b (the rear restriction portion) that are separated from each other in the longitudinal direction. The interiorly protruding portion 71c and the convex insertion portion 72b are restricted by the guide rail 20 from moving vertically in a state where the movable panel 12 is in the fully closed position. Moreover, the front link 60 and the rear link 70 are arranged at the different positions from each other in the width direction so that the first distance is longer than the second distance in a state where the movable panel 12 is in the fully closed position (see FIG. 2). In addition, the front link 60 and the rear link 70 are arranged at the different positions from each other in the width direction so that the first distance is shorter than the second distance in a state where the movable panel 12 is in the fully opened position (see FIG. 16). Here, the first distance corresponds to the distance between the convex insertion portion 72b of the rear link 70 and the third guide pin 62c of the front link 60. The second distance corresponds to the distance between the convex insertion portion 72b and the fourth guide pin 62d of the front link 60.

Thus, according to the aforementioned configuration of the sunroof apparatus 10 of the embodiment, when the movable panel 12 is moved to the fully opened position, the front link 60 may be appropriately positioned rearward than the rear link 70. At this time, the drive shoe 50 is connected to the front link 60, therefore being positioned close to the front link 60 while not being separated from the front link 60. As a result, the length of the guide rail 20 in the longitudinal direction may be minimized while the maximum opening area created by the movable panel 12 is inhibited from being reduced.

Furthermore, according to the sunroof apparatus 10 of the embodiment, the front link 60 and the rear link 70 are arranged at different positions on a plain surface so that the rear end portion of the front link 60 is positioned further forward than the convex insertion portion 72b of the rear link 70 in a state where the movable panel 12 is in the fully closed position. The plain surface extends in a direction perpendicular to a direction in which the guide rail 20 extends. In addition, the front link 60 and the rear link 70 are arranged at the different positions on the plain surface so that the convex insertion portion 72b of the rear link 70 is positioned further forward than the rear end portion of the front link 60 in a state where the movable panel 12 is in the fully opened position.

Thus, according to the aforementioned configuration of the sunroof apparatus 10 of the embodiment, when the movable panel 12 is moved to the fully opened position, the front link 60 may be appropriately positioned rearward than the rear link 70. At this time, the drive shoe 50 is connected to the front link 60, therefore being positioned close to the front link 60 while not being separated from the front link 60. As a result, the length of the guide rail 20 in the longitudinal direction may be minimized without the reduction of the maximum opening area created by the movable panel 12.

Additionally, when the movable panel 12 is being moved in the opening direction toward the fully opened position, the front end portion of the front link 60 moves rearward and is therefore positioned further rearward than the front end portion of the rear link 70. Here, the front link 60 and the rear link 70 are arranged at the different positions from each other in the width direction; therefore, the front link 60 and the rear link 70 may smoothly move rearward while not interfering with each other.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus operating a movable panel in opening and closing directions, the movable panel being arranged at an opening portion of a roof panel for a vehicle, the opening and closing operations including tilt-up and slide modes of the movable panel, the roof apparatus comprising:
   a functional bracket supporting the movable panel;
   a guide rail adapted to be attached to the roof panel, the guide rail extending in a longitudinal direction of the vehicle;
   a drive shoe driven to move along the guide rail in the longitudinal direction;
   a front link connected to a front portion of the functional bracket to move in the longitudinal direction in conjunction with the movement of the drive shoe;
   a front guide portion engaged with the front portion of the functional bracket and with a front portion of the front link to guide the front portions of the functional bracket and the front link to move in the longitudinal direction;
   a check member provided to be engageable with the drive shoe, the check member being engaged with the drive shoe to move rearward in conjunction with the movement of the drive shoe in a rearward direction of the vehicle when a distance of the rearward movement of the drive shoe is shorter than a predetermined distance, the check member being disengaged from the drive shoe when the distance of the rearward movement of the drive shoe is equal to or longer than the predetermined distance;
   a rear link engaged with the check member to support a portion of the functional bracket so that the portion is slidable in the longitudinal direction, the portion being positioned rearward than the front portion of the functional bracket; and
   a rear guide portion guiding the rear link to move in the longitudinal direction.

2. The roof apparatus according to claim 1, further comprising a restriction portion arranged at the guide rail and a biasing member biasing the check member in a direction toward the restriction portion, wherein the check member is provided rotatably about the engagement position with the rear link, and
   wherein the restriction portion engages with the check member to restrict the rearward movement of the check member to release the engagement between the check member and the drive shoe.

3. The roof apparatus according to claim 2, wherein the check member includes an extending portion extending toward the restriction portion, the extending portion sliding on a guide surface of the guide rail, and
   wherein the restriction portion serves as a lock portion partially recessed in the guide surface of the guide rail to lock with the extending portion.

4. The roof apparatus according to claim 3, wherein the drive shoe includes a shaft portion extending in a width direction of the vehicle, and
   wherein the check member includes an engagement groove having a rear end portion, the engagement groove being engageable via the rear end portion with the shaft portion of the drive shoe, the engagement groove forming a circular arc shape extending obliquely upward and rearward in a state where the engagement groove is engaged with the shaft portion.

5. The roof apparatus according to claim 3, wherein the extending portion includes an edge portion facing the guide surface, the edge portion being formed in a circularly curved shape.

6. The roof apparatus according to claim 2, wherein the check member includes an elastic portion at the edge portion located in a direction toward which the check member is biased by the biasing member.

7. The roof apparatus according to claim 6, wherein the elastic portion is a deformable portion integrally formed with a main body of the check member.

8. The roof apparatus according to claim 2, wherein the check member includes a recessed portion and a temporary fixation portion formed at the recessed portion, and
   wherein the biasing member serves as a compression spring arranged in the recessed portion, the compression spring including a first end portion engaged with the check member and a second end portion engaged with the rear link, and the second end portion of the compression spring is temporarily fixed to the temporary fixation portion when attaching the rear link and the check member to each other by the compression spring.

* * * * *